(12) United States Patent
Estep et al.

(10) Patent No.: US 12,066,841 B2
(45) Date of Patent: Aug. 20, 2024

(54) SYSTEMS AND METHODS FOR RELATIVE POSE DETERMINATION AND FIELD ENFORCEMENT OF MATERIALS HANDLING VEHICLES USING ULTRA-WIDEBAND RADIO TECHNOLOGY

(71) Applicant: Crown Equipment Corporation, New Bremen, OH (US)

(72) Inventors: Ryan Estep, Auckland (NZ); Justin Bennett, Newburgh, IN (US); Mike Etienne Ciholas, Newburgh, IN (US); Ben Morelli, Auckland (NZ); Chad Lefeld, Coldwater, OH (US); Trisha Marie Luthman, Covington, OH (US)

(73) Assignee: Crown Equipment Corporation, New Bremen, OH (US)

( * ) Notice: Subject to any disclaimer, the term of this patent is extended or adjusted under 35 U.S.C. 154(b) by 294 days.

(21) Appl. No.: 17/493,221

(22) Filed: Oct. 4, 2021

(65) Prior Publication Data
US 2022/0108613 A1  Apr. 7, 2022

Related U.S. Application Data

(60) Provisional application No. 63/231,508, filed on Aug. 10, 2021, provisional application No. 63/231,506, (Continued)

(51) Int. Cl.
*G05D 1/242* (2024.01)
*B66F 9/06* (2006.01)
(Continued)

(52) U.S. Cl.
CPC ............. *G05D 1/242* (2024.01); *B66F 9/063* (2013.01); *B66F 9/0755* (2013.01);
(Continued)

(58) Field of Classification Search
CPC .. G05D 1/0022; G05D 1/0027; G05D 1/0289; G05D 2201/0216; G05D 1/242;
(Continued)

(56) References Cited

U.S. PATENT DOCUMENTS

| 7,518,556 B2 | 4/2009 | Kurashima et al. |
| 8,954,252 B1 | 2/2015 | Urmson et al. |

(Continued)

FOREIGN PATENT DOCUMENTS

| CN | 103094676 A | 5/2013 |
| CN | 213799435 U | 7/2021 |

(Continued)

OTHER PUBLICATIONS

International Search Report and Written Opinion, PCT/US2021/053427 dated Mar. 28, 2022 (21 pages).

*Primary Examiner* — Dale W Hilgendorf
(74) *Attorney, Agent, or Firm* — DINSMORE & SHOHL LLP

(57) ABSTRACT

According to the embodiments described herein, system and methods for determining relative pose of materials handling vehicles in an industrial environment may include utilizing ultra-wideband (UWB) antenna array systems respectively mounted on the materials handling vehicles to send mutually received information to determine the relative pose between the vehicles, determining one or more fields of each materials handling vehicle, and determining one or more overlapping fields between the materials handling vehicles based on the determined one or more fields and the relative pose. A vehicle control may be implemented based on the determined relative pose and the overlapping fields as a field enforcement, such as a control action to avoid collision between the vehicles.

16 Claims, 17 Drawing Sheets

Related U.S. Application Data filed on Aug. 10, 2021, provisional application No. 63/104,796, filed on Oct. 23, 2020, provisional application No. 63/104,567, filed on Oct. 23, 2020, provisional application No. 63/087,652, filed on Oct. 5, 2020, provisional application No. 63/087,541, filed on Oct. 5, 2020, provisional application No. 63/087,548, filed on Oct. 5, 2020, provisional application No. 63/087,544, filed on Oct. 5, 2020, provisional application No. 63/087,543, filed on Oct. 5, 2020.

(51) Int. Cl.

| | |
|---|---|
| *B66F 9/075* | (2006.01) |
| *G01S 5/02* | (2010.01) |
| *G01S 5/10* | (2006.01) |
| *G05D 1/00* | (2024.01) |
| *G05D 1/24* | (2024.01) |
| *G05D 1/243* | (2024.01) |
| *G05D 1/69* | (2024.01) |
| *G05D 105/80* | (2024.01) |
| *G05D 107/70* | (2024.01) |
| *G07C 5/08* | (2006.01) |
| *G08G 1/16* | (2006.01) |
| *H01Q 1/12* | (2006.01) |
| *H01Q 5/25* | (2015.01) |
| *H04B 1/7163* | (2011.01) |

(52) U.S. Cl.
CPC .............. *G01S 5/0284* (2013.01); *G01S 5/10* (2013.01); *G05D 1/0022* (2013.01); *G05D 1/0027* (2013.01); *G05D 1/0289* (2013.01); *G05D 1/24* (2024.01); *G05D 1/2437* (2024.01); *G05D 1/69* (2024.01); *G07C 5/0825* (2013.01); *G08G 1/163* (2013.01); *H01Q 1/1221* (2013.01); *H01Q 5/25* (2015.01); *H04B 1/7163* (2013.01); *G05D 2105/93* (2024.01); *G05D 2107/70* (2024.01)

(58) Field of Classification Search
CPC .......... G05D 1/24; G05D 1/2437; G05D 1/69; B66F 9/063; B66F 9/0755; G01S 5/0284; G01S 5/10; G07C 5/0825; G08G 1/163; H01Q 1/1221; H01Q 5/25; H04B 1/7163
See application file for complete search history.

(56) References Cited

U.S. PATENT DOCUMENTS

| | | |
|---|---|---|
| 9,174,830 B1 | 11/2015 | Bell |
| 9,221,392 B2 | 12/2015 | Chen |
| 9,340,399 B2 | 5/2016 | Bell |
| 9,349,181 B2 | 5/2016 | Chandrasekar et al. |
| 9,523,517 B2 | 12/2016 | Warpup et al. |
| 9,731,417 B2 | 8/2017 | Bruemmer et al. |
| 9,811,088 B2 | 11/2017 | Walton et al. |
| 9,958,873 B2 | 5/2018 | Thomson |
| 9,984,467 B2 | 5/2018 | Chandrasekar et al. |
| 10,430,073 B2 | 10/2019 | Castaneda et al. |
| 10,522,054 B2 | 12/2019 | Manci et al. |
| 10,754,466 B2 | 8/2020 | Ochenas et al. |
| 2003/0028323 A1* | 2/2003 | Zeitler ................ G01S 5/14 |
| | | 701/408 |
| 2009/0174605 A1 | 7/2009 | Chang |
| 2014/0035725 A1* | 2/2014 | Bruemmer ........... G05D 1/0274 |
| | | 340/8.1 |
| 2014/0188576 A1 | 7/2014 | de Oliveira et al. |
| 2016/0193729 A1* | 7/2016 | Williams ........... G01C 21/3856 |
| | | 901/1 |
| 2016/0259032 A1* | 9/2016 | Hehn .................... H04W 84/18 |
| 2016/0353238 A1* | 12/2016 | Gherardi ................ G05D 1/102 |
| 2016/0357193 A1* | 12/2016 | Bruemmer ........... G05D 1/106 |
| 2017/0374511 A1* | 12/2017 | Buchmann ........... G05D 1/0289 |
| 2018/0059231 A1* | 3/2018 | Dewberry ............ G01S 13/878 |
| 2018/0143312 A1* | 5/2018 | High ...................... H04W 4/33 |
| 2019/0339690 A1 | 11/2019 | Kwak |
| 2019/0339713 A1* | 11/2019 | Kwak ................ G06K 7/10306 |
| 2019/0355196 A1 | 11/2019 | Plattner et al. |
| 2022/0001836 A1* | 1/2022 | Baek ................... G01S 13/878 |
| 2022/0292973 A1* | 9/2022 | Orlando .............. B66F 9/0755 |

FOREIGN PATENT DOCUMENTS

| | | |
|---|---|---|
| KR | 20090023693 A | 3/2009 |
| WO | 2020/032412 A1 | 2/2020 |

\* cited by examiner

SYSTEMS AND METHODS FOR RELATIVE POSE DETERMINATION AND FIELD ENFORCEMENT OF MATERIALS HANDLING VEHICLES USING ULTRA-WIDEBAND RADIO TECHNOLOGY

CROSS-REFERENCE TO RELATED APPLICATIONS

The present application claims the benefit of U.S. Provisional App. No. 63/087,541, filed Oct. 5, 2020, entitled ANTENNA MOUNTING STRUCTURES FOR INDUSTRIAL VEHICLES; U.S. Provisional App. No. 63/104,567, filed Oct. 23, 2020, entitled INDUSTRIAL VEHICLE ANTENNA MOUNTING STRUCTURES; U.S. Provisional App. No. 63/231,508, filed Aug. 10, 2021, entitled INDUSTRIAL VEHICLE ANTENNA MOUNTING STRUCTURES AND ANTENNA POSITIONING CONFIGURATIONS; U.S. Provisional App. No. 63/087,543, filed Oct. 5, 2020, entitled SYSTEMS AND METHODS FOR SENSING A RELATIVE POSE OF MATERIALS HANDLING VEHICLES USING ULTRA-WIDEBAND RADIO TECHNOLOGY; U.S. Provisional App. No. 63/087,548, filed Oct. 5, 2020, entitled SYSTEMS AND METHODS FOR FIELD ENFORCEMENT OF MATERIALS HANDLING VEHICLES USING ULTRA-WIDEBAND RADIO TECHNOLOGY; U.S. Provisional App. No. 63/087,652, filed Oct. 5, 2020, entitled SYSTEMS AND METHODS FOR FIELD ENFORCEMENT OF MATERIALS HANDLING VEHICLES USING ULTRA-WIDEBAND RADIO TECHNOLOGY; U.S. Provisional App. No. 63/087,544, filed Oct. 5, 2020, entitled LIGHT COMPONENTS FOR DISPLAYING SYMBOLS CORRESPONDING TO VEHICLE STATUSES; U.S. Provisional App. No. 63/104,796, filed Oct. 23, 2020, entitled LIGHT COMPONENTS FOR DISPLAYING SYMBOLS CORRESPONDING TO VEHICLE STATUSES; and U.S. Provisional App. No. 63/231,506, filed Aug. 10, 2021, entitled LIGHT COMPONENTS FOR DISPLAYING SYMBOLS AND LIGHT COMPONENT MOUNTING ARRANGEMENTS; the entireties of which are incorporated herein by reference.

TECHNICAL FIELD

The present specification generally relates to systems and methods for relative pose sensing and field enforcement of materials handling vehicles to assist with managing vehicle operation within a defined area in an industrial environment and, more specifically, to systems and methods for sensing and determining a relative pose and field enforcement based on sensing and determining relative poses of materials handling vehicles using ultra-wideband (UWB) radio technology and overlapping fields.

BACKGROUND

In order to move items about an industrial environment, workers often utilize industrial vehicles, including for example, forklift trucks, hand and motor driven pallet trucks, and/or other materials handling vehicles. The industrial vehicles can be configured as an automated guided vehicle that navigates through the industrial environment or a manually guided vehicle that knows its location within the industrial environment. In order to facilitate automated guidance, navigation, or both, the industrial vehicle may be adapted for localization within the environment. That is the industrial vehicle can be adapted with sensors and processors for determining the location of the industrial vehicle within the environment such as, for example, pose and position of the industrial vehicle.

SUMMARY

In one embodiment, materials handling vehicle may comprise one or more vehicular processors, a drive mechanism configured to move the materials handling vehicle along an inventory transit surface, a materials handling mechanism configured to store and retrieve goods in a storage bay of an industrial environment, and vehicle control architecture in communication with the drive and materials handling mechanisms. The vehicular processor(s) of the materials handling vehicle may execute vehicle functions to determine a relative pose of a materials handling vehicle with respect to the materials handling vehicle based on UWB signals transmitted from multi-antenna arrays on each of the materials handling vehicles, determine one or more fields of each materials handling vehicle, and determine one or more overlapping fields between the materials handling vehicles based on the determined one or more fields and the relative pose, and implement a vehicle control action based on the determined one or more overlapping fields.

According to an embodiment of the present disclosure, a relative pose determination system comprises a first materials handling vehicle, and a second materials handling vehicle, each materials handling vehicle comprising a vehicle body and a vehicle position processor, wherein the first and second materials handling vehicles are configured to navigate a vehicle transit surface in a warehouse environment, the first materials handling vehicle comprises a first ultra-wideband (UWB) antenna array mounted to the vehicle body, and the second materials handling vehicle comprises a second UWB antenna array mounted to the vehicle body. Each vehicle position processor is configured to: transmit a first UWB signal from the first UWB antenna array of the first materials handling vehicle to the second UWB antenna array of the second materials handling vehicle, receive the first UWB signal at the second UWB antenna array of the second materials handling vehicle, determine a second materials handling vehicle set of information based on the first UWB signal, and transmit a second UWB signal comprising the second materials handling vehicle set of information from the second UWB antenna array of the second materials handling vehicle to the first UWB antenna array of the first materials handling vehicle. Each vehicle position processor is further configured to: determine a first materials handling vehicle set of information based on the second UWB signal, transmit a third UWB signal comprising the first materials handling vehicle set of information from the first UWB antenna array of the first materials handling vehicle to the second UWB antenna array of the second materials handling vehicle, determine a relative pose of each of the first and second materials handling vehicles with respect to each other based on the second UWB signal and the third UWB signal, and operate at least one of the first and second materials handling vehicles based on the relative pose.

In accordance with another embodiment of the present disclosure, a relative pose determination system comprises a vehicle position processor, a first materials handling vehicle, and a second materials handling vehicle, each materials handling vehicle comprising a vehicle body. The first and second materials handling vehicles are configured to navigate a vehicle transit surface in a warehouse environment, the first materials handling vehicle comprises a first ultra-wideband (UWB) antenna array mounted to the vehicle body, and the second materials handling vehicle comprises a second UWB antenna array mounted to the vehicle body. The vehicle position processor is configured to: transmit a first UWB signal from the first UWB antenna array of the first materials handling vehicle to the second UWB antenna array of the second materials handling vehicle, receive the first UWB signal at the second UWB antenna array of the second materials handling vehicle, and determine a second materials handling vehicle set of information based on the first UWB signal. The vehicle position processor is further configured to: transmit a second UWB signal comprising the second materials handling vehicle set of information from the second UWB antenna array of the second materials handling vehicle to the first UWB antenna array of the first materials handling vehicle, determine a first materials handling vehicle set of information based on the second UWB signal, transmit a third UWB signal comprising the first materials handling vehicle set of information from the first UWB antenna array of the first materials handling vehicle to the second UWB antenna array of the second materials handling vehicle, determine a relative pose of each of the first and second materials handling vehicles with respect to each other based on the second UWB signal and the third UWB signal, and operate at least one of the first and second materials handling vehicles based on the relative pose.

In accordance with yet another embodiment of the present disclosure, a method determines relative pose between a first materials handling vehicle and a second materials handling vehicle, each materials handling vehicle comprising a vehicle body, the first materials handling vehicle comprising a first ultra-wideband (UWB) antenna array mounted to the vehicle body, the second materials handling vehicle comprising a second UWB antenna array mounted to the vehicle body. The method comprises transmitting a first UWB signal from the first UWB antenna array of the first materials handling vehicle to the second UWB antenna array of the second materials handling vehicle, receiving the first UWB signal at the second UWB antenna array of the second materials handling vehicle, determining a second materials handling vehicle set of information based on the first UWB signal, and transmitting a second UWB signal comprising the second materials handling vehicle set of information from the second UWB antenna array of the second materials handling vehicle to the first UWB antenna array of the first materials handling vehicle. The method further comprises determining a first materials handling vehicle set of information based on the second UWB signal, transmitting a third UWB signal comprising the first materials handling vehicle set of information from the first UWB antenna array of the first materials handling vehicle to the second UWB antenna array of the second materials handling vehicle, determining a relative pose of each of the first and second materials handling vehicles with respect to each other based on the second UWB signal and the third UWB signal, and operating at least one of the first and second materials handling vehicles based on the relative pose.

According to an embodiment of the present disclosure, a field enforcement system comprises a first materials handling vehicle, and a second materials handling vehicle, each materials handling vehicle comprising a vehicle body and a vehicle position processor. The first and second materials handling vehicles are configured to navigate a vehicle transit surface in a warehouse environment, the first materials handling vehicle comprises a first ultra-wideband (UWB) antenna array mounted to the vehicle body, and the second materials handling vehicle comprises a second UWB antenna array mounted to the vehicle body. Each vehicle position processor is configured to: transmit respective UWB signals comprising vehicle information between respective UWB antenna arrays of the first and second materials handling vehicles, and determine a relative pose of each of the first and second materials handling vehicles with respect to each other based on transmitted UWB signals comprising the vehicle information. Each vehicle position processor is further configured to: determine a first virtual field for the first materials handling vehicle and a second virtual field for the second materials handling vehicle, determine a field infringement occurrence when a portion of the first virtual field overlaps a portion of the second virtual field based on the relative pose, and operate at least one of the first and second materials handling vehicles based on the field infringement occurrence.

In accordance with another embodiment of the present disclosure, a field enforcement system comprises a vehicle position processor, a first materials handling vehicle, and a second materials handling vehicle, each materials handling vehicle comprising a vehicle body. The first and second materials handling vehicles are configured to navigate a vehicle transit surface in a warehouse environment, the first materials handling vehicle comprises a first ultra-wideband (UWB) antenna array mounted to the vehicle body, and the second materials handling vehicle comprises a second UWB antenna array mounted to the vehicle body. The vehicle position processor is configured to: transmit respective UWB signals comprising vehicle information between respective UWB antenna arrays of the first and second materials handling vehicles, determine a relative pose of each of the first and second materials handling vehicles with respect to each other based on transmitted UWB signals comprising the vehicle information, and determine a first virtual field for the first materials handling vehicle and a second virtual field for the second materials handling vehicle. The vehicle position processor is further configured to: determine a field infringement occurrence when a portion of the first virtual field overlaps a portion of the second virtual field based on the relative pose, and operate at least one of the first and second materials handling vehicles based on the field infringement occurrence.

In accordance with yet another embodiment of the present disclosure, a method is disclosed for field enforcement between a first materials handling vehicle and a second materials handling vehicle, each materials handling vehicle comprising a vehicle body, the first materials handling vehicle comprising a first ultra-wideband (UWB) antenna array mounted to the vehicle body, the second materials handling vehicle comprising a second UWB antenna array mounted to the vehicle body. The method comprises transmitting respective UWB signals comprising vehicle information between respective UWB antenna arrays of the first and second materials handling vehicles, and determining a relative pose of each of the first and second materials handling vehicles with respect to each other based on transmitted UWB signals comprising the vehicle information. The method further comprises determining a first virtual field for the first materials handling vehicle and a second virtual field for the second materials handling vehicle, determining a field infringement occurrence when a portion of the first virtual field overlaps a portion of the second virtual field based on the relative pose, and operating at least one of the first and second materials handling vehicles based on the field infringement occurrence.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein generally relate to systems and methods for relative pose sensing and field enforcement of materials handling vehicles using ultra-wideband (UWB) radio technology. The relative pose sensing systems and methods may be used on a Time of Flight (ToF) measuring system with bi-direction communication, as described in greater detail below. The field enforcement systems and methods may use localization techniques to determine and assist with managing vehicle presence in an industrial environment as described herein. Localization is utilized herein to refer to any of a variety of system configurations that enable active tracking of a vehicle location in a warehouse, industrial or commercial facility, or other environment. The concepts of the present disclosure are not limited to any particular localization system configuration and are deemed to be applicable to and used in combination with any of a variety of conventional and yet-to-be developed localization systems. Such localizations systems may include those described in U.S. Pat. No. 9,349,181 issued on May 24, 2016, entitled LOST VEHICLE RECOVERY UTILIZING ASSOCIATED FEATURE PAIRS, and U.S. Pat. No. 9,984,467 issued May 29, 2018, entitled VEHICLE POSITIONING OR NAVIGATION UTILIZING ASSOCIATED FEATURE PAIRS.

The localization systems may be used to localize and/or navigate an industrial vehicle through an industrial environment, such as a warehouse, stock yard, or the like. In some embodiments, a camera, laser based system, and/or UWB based system 150 can be mounted to an industrial vehicle (e.g., automated guided vehicle or a manually guided vehicle) that navigates through a warehouse and can assist with vehicle localization. The laser based system may include a laser scanner, a laser rangefinder, a 2D/3D mapping laser, a lidar, or combinations thereof. The UWB based system 150 may include a UWB system array including a plurality of UWB antenna coupled together, as described in greater detail below. In embodiments, the UWB systems described herein may be employed semi-autonomous or fully autonomous automation as a primary or secondary safety system working alongside the lidar and/or image sensors.

Figure 1A:
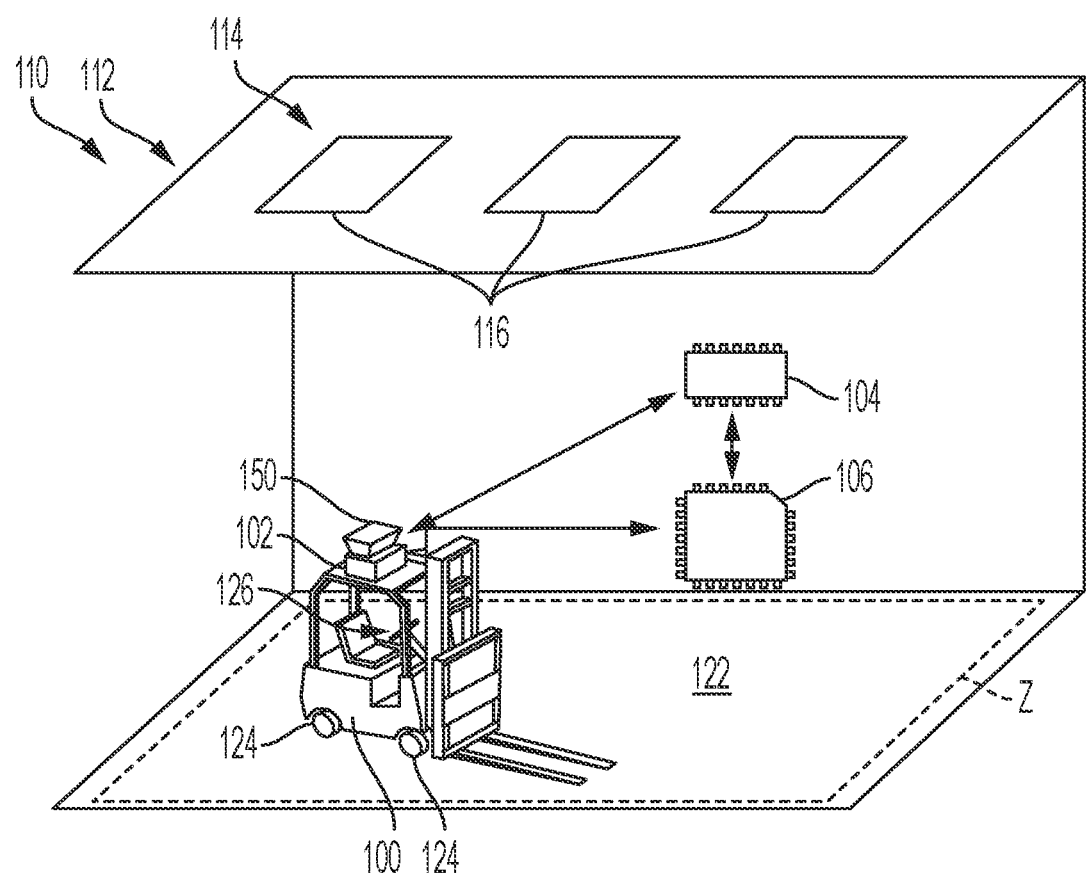
FIG. 1A depicts a materials handling vehicle in a warehouse including a UWB antenna system, according to one or more embodiments shown and described herein.

Referring now to FIG. 1A, a vehicle 100 can be configured to navigate through an industrial facility such as a warehouse 110. The vehicle 100 can comprise a materials handling vehicle including a drive mechanism to move the materials handling vehicle along an inventory transit surface, a materials handling mechanism configured to store and retrieve goods in a storage bay of an industrial facility, and vehicle control architecture in communication with the drive and materials handling mechanisms. The vehicle 100 can comprise an industrial vehicle such as a materials handling vehicle for lifting and moving a payload such as, for example, a forklift truck, a reach truck, a turret truck, a walkie stacker truck, a tow tractor, a pallet truck, a high/low, a stacker-truck, a trailer loader, a sideloader, a fork hoist, or the like. The industrial vehicle can be configured to automatically or manually navigate an inventory transit surface such as a surface 122 of the warehouse 110 along a desired path. Accordingly, the vehicle 100 can be directed forwards and backwards by rotation of one or more wheels 124.

Additionally, the vehicle 100 can be caused to change direction by steering the one or more wheels 124. Optionally, the vehicle can comprise operator controls 126 for controlling functions of the vehicle such as, but not limited to, the speed of the wheels 124, the orientation of the wheels 124, or the like. The operator controls 126 can comprise controls that are assigned to functions of the vehicle 100 such as, for example, switches, buttons, levers, handles, pedals, input/output devices, or the like. It is noted that the term "navigate" as used herein means movement control or route planning of a vehicle from one place to another including, but not limited to, plotting a graphical path for a manual vehicle operation, providing a set of turn by turn instructions for manual operation, or providing an automated control guiding the vehicle along a travel path that may include such turn by turn instructions for automated operation. It is noted that the term "operate" as used herein means operation or control of operation of a vehicle, such as performing a vehicle control action including, but not limited to, setting a speed limit, issuing operator alerts, and other vehicle control actions.

In embodiments, the vehicle 100 can further comprise a camera 102 for capturing overhead images such as input images of overhead features. The camera 102 can be any device capable of capturing the visual appearance of an object and transforming the visual appearance into an image. In some embodiments, the vehicle 100 can be located within the warehouse 110 and be configured to capture overhead images of the ceiling 112 of the warehouse 110.

The ceiling 112 of the warehouse 110 can comprise overhead features such as, but not limited to, ceiling lights 114 for providing illumination from the ceiling 112 or generally from above a vehicle operating in the warehouse. The ceiling lights 114 can comprise substantially rectangular lights such as, for example, skylights 116, fluorescent lights, or the like; and may be mounted in or suspended from the ceiling or wall structures so as to provide illumination from above.

The embodiments described herein can comprise one or more vehicular processors such as processors 104 communicatively coupled to the vehicle 100. The one or more processors 104 can execute machine readable instructions to implement any of the methods or functions described herein automatically. Memory 106 for storing machine readable instructions can be communicatively coupled to the one or more processors 104, the vehicle 100, or any combination thereof. The one or more processors 104 can comprise a processor, an integrated circuit, a microchip, a computer, or any other computing device capable of executing machine readable instructions or that has been configured to execute functions in a manner analogous to machine readable instructions. The memory 106 can comprise RAM, ROM, a flash memory, a hard drive, or any non-transitory device capable of storing machine readable instructions.

The one or more processors 104 and the memory 106 may be integral with the vehicle 100. Moreover, each of the one or more processors 104 and the memory 106 can be separated from the vehicle 100 and/or the camera 102. For example, a management server, server, or a mobile computing device can comprise the one or more processors 104, the memory 106, or both. It is noted that the one or more processors 104, the memory 106, and the camera 102 may be discrete components communicatively coupled with one another without departing from the scope of the present disclosure. Accordingly, in some embodiments, components of the one or more processors 104, components of the memory 106, and components of the camera 102 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

As is noted above, the vehicle 100 can comprise or be communicatively coupled with the one or more processors 104. Accordingly, the one or more processors 104 can execute machine readable instructions to operate or replace the function of the operator controls 126. The machine readable instructions can be stored upon the memory 106. Accordingly, in some embodiments, the vehicle 100 can be navigated automatically by the one or more processors 104 executing the machine readable instructions. In some embodiments, the location of the vehicle can be monitored by the localization system as the vehicle 100 is navigated.

Figure 1B:
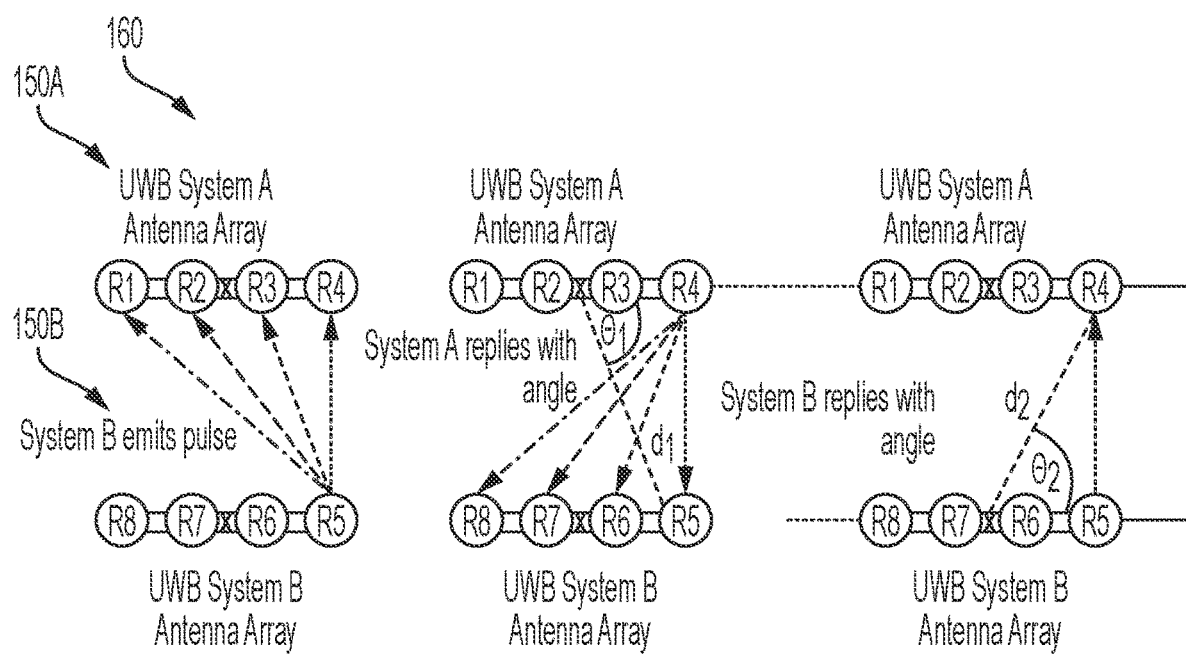
FIG. 1B depicts a pair of UWB antenna systems respectively disposed on materials handling vehicles in a warehouse to determine a relative pose between the materials handling vehicles, according to one or more embodiments shown and described herein.

Referring to FIG. 1A, the materials handling vehicle 100 can be configured to navigate through an industrial environment such as the warehouse 110. The materials handling vehicle 100 can be configured to automatically or manually navigate an inventory transit surface such as a surface 122 of the warehouse 110 along a desired path. The materials handling vehicle 110 may further be configured to implement controls to take an action when determining a relative pose with respect to another materials handling vehicle 100 through a UWB system 150. Such an action may be a braking action or other collision avoid action. In an embodiment, a UWB system 160 may include a UWB system 150A as a System A mounted on a first materials handling vehicle 100 and a UWB system 150B as a System B mounted on a second materials handling vehicle 100 as shown in FIG. 1B. Each UWB system 150A, 150B may include a plurality of UWB antennas as anchors mounted together in an array with a determined center and positioned with respect to a selected and defined point of the vehicle that is measurable or determinable relative to the vehicle frame and individual anchor positions, such as a kinematic center of the vehicle.

The array of UWB system 150A of FIG. 1B includes UWB antennas R1, R2, R3, and R4, with a center of the array defined by an X marking between the R2 and R3 antennas. In embodiments, the center of the array is the location from which an angle of arrival is sensed. Further, the angle of arrival may be corrected based on a predefined original point of each truck, such as the kinematic center of the vehicle. The array of UWB system 150B of FIG. 1B includes UWB antennas R5, R6, R7, and R8, with a center of the array defined by an X marking between the R6 and R7 antennas.

Within each materials handling vehicle 100 including a multiple antenna UWB System 150A, 150B, the UWB antennas may be synced using a UWB sync signal and either a sync cable to each antenna (e.g., star topology) or a single clock cable connected to each antenna in turn (e.g., daisy chain topology). Once each array is synced, the array can sense both the distance a UWB signal has traveled (e.g., using a common method called Two Way Ranging) and angle of arrival of the UWB signal (e.g., by measuring the minute time differences of the reception of the signal on each antenna). As described in greater detail below with respect to the process 300 of FIG. 3, a relative pose of a pair of vehicles 100 using a UWB antenna array mounted as UWB Systems 150A, 150B respectively to each vehicle 100 may be determined. By receiving UWB signal information from a node of the array (e.g., UWB antenna) including an angle of arrival and distance as described in greater detail below, and with a distance between the node and a center of the array being known, a position and orientation of the node is determined. Thus, a position and orientation of the vehicle onto which the node is mounted in a known configuration with respect to the center of the vehicle is determined to assist with determination of vehicle pose. As described herein, "pose" references a position and orientation of a materials handling vehicle 100, such as within the warehouse 110. A "relative pose" of a materials handling vehicle 100 references a position and orientation of the materials handling vehicle 100 relative to another object, such as a second materials handling vehicle 100 as described in greater detail below.

Figure 1C:
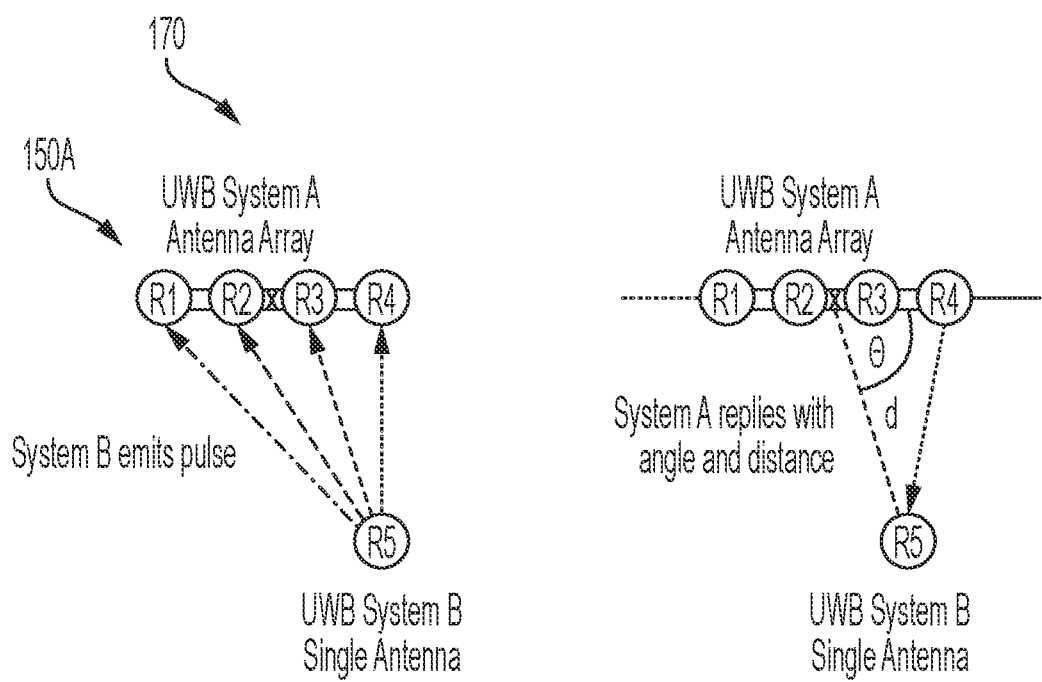
FIG. 1C depicts a pair of UWB antenna systems respectively disposed on materials handling vehicles in a warehouse to determine a position and distance of one of the materials handling vehicles, according to one or more embodiments shown and described herein.

In another embodiment, referring to FIG. 1C, the UWB system 170 may include a UWB system 150A as a System A mounted on a first materials handling vehicle 100 and another System B as a single UWB antenna system that may be mounted on a second materials handling vehicle 100 or in another location of the warehouse 110. With the method of FIG. 1C, a relative position can be determined for a remote vehicle in this system configuration, and circular fields may be enforced on the remote vehicle. In the vehicles 100 described herein, the vehicles may include one or more UWB antenna arrays and a beacon. At a lowered position of an operator compartment of at least one vehicle 100, the system configuration of FIG. 1B may be implemented to determine relative pose between vehicles 100 as relative pose observations. Regarding systems with multiple UWB antenna arrays on the different vehicles 100, a control action from multiple observations (e.g., the relative pose observations) may be considered in combination to determine a best observation (such as one of highest ranking or best fit) to determine field infringement between the vehicles 100, as described in greater detail below.

When the operator compartment is raised, the beacon may be configured to beacon out a signal and become a target for other vehicles 100 following the vehicle 100 with the operator compartment raised to perform the relative position observation of FIG. 1C and enforce associated circular virtual fields. The system configuration of FIG. 1C may thus aid to compensate for blindspots that are created for a UWB antenna array on an overhead guard when the vehicle is operating at a height such as when the operator compartment is raised. Thus, a relative position of vehicles 100 may be determined when a remote vehicle is not able to sense an angle of arrival due to a blindspot created for the UWB antenna array. The virtual fields for the remote vehicle in such an instance may be circular, and a field infringement calculation and behavior may proceed such that circular fields are checked for infringement with respect to a local vehicle's fully defined fields. The circular fields may be selected from a pre-programmed secondary fieldset or dynamically calculated based on primary operation fully defined fields.

Figure 2:
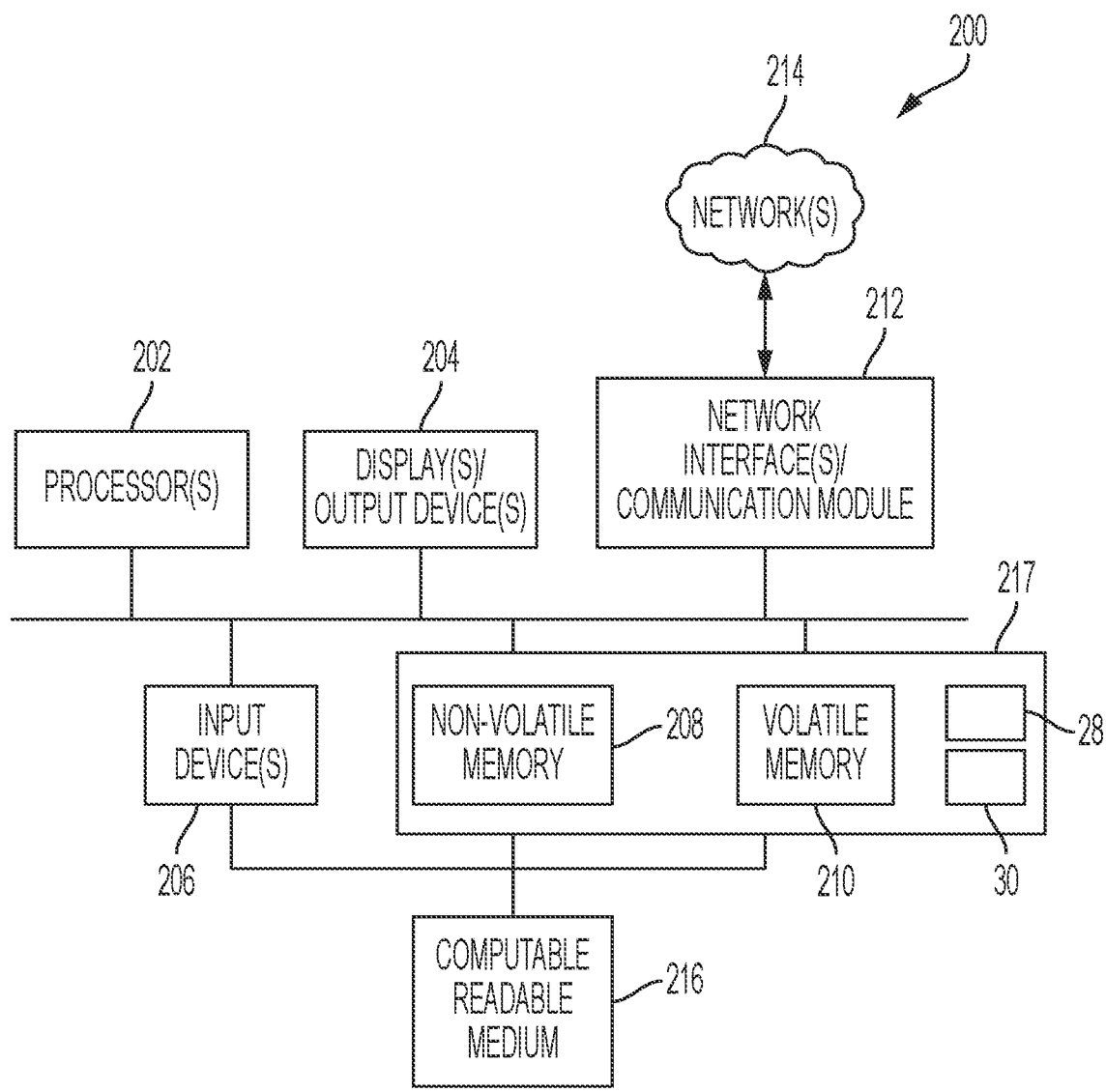
FIG. 2 depicts a schematic illustration of a system for implementing computer and software based methods to determine pose or position, according to one or more embodiments shown and described herein.

Referring to FIG. 2, the embodiments described herein can comprise a system 200 including one or more vehicular processors such as processors 202 (which may be the one or more processors 104 and may be referenced herein as vehicle position processors 202) that may be communicatively coupled to a memory 217. A network interface hardware 212 may facilitate communications over a network 214 via wires, a wide area network, a local area network, a personal area network, a cellular network, a satellite network, and the like. Suitable personal area networks may include wireless technologies such as, for example, IrDA, Bluetooth®, Wireless USB, Z-Wave®, ZigBee®, and/or other near field communication protocols. Suitable personal area networks may similarly include wired computer buses such as, for example, USB and FireWire®. Suitable cellular networks include, but are not limited to, technologies such as LTE, WiMAX, UMTS, CDMA, and GSM. The network interface hardware 212 can be communicatively coupled to any device capable of transmitting and/or receiving data via the network 214. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices.

The one or more processors 202 can execute machine readable instructions to implement any of the methods or functions described herein automatically. Memory 217 as at least one of non-volatile memory 208 or volatile memory 210 in a computable readable medium 216 for storing machine readable instructions can be communicatively coupled to the one or more processors 202. The one or more processors 202 can comprise a processor, an integrated circuit, a microchip, a computer, or any other computing device capable of executing machine readable instructions or that has been configured to execute functions in a manner analogous to machine readable instructions. The computable readable medium 216 can comprise RAM, ROM, a flash memory, a hard drive, or any non-transitory device capable of storing machine readable instructions.

Each of the one or more processors 202 and the memory 217 can be integral with the vehicle 100. Moreover, each of the one or more processors 202 and the memory 217 can be separated from the vehicle 100. For example, a management server, server, or a mobile computing device can comprise the one or more processors 202, the memory 217, or both. It is noted that the one or more processors 202 and the memory 217 may be discrete components communicatively coupled with one another without departing from the scope of the present disclosure. Accordingly, in some embodiments, components of the one or more processors 202 and components of the memory 217 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium such as computable readable medium 216. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

In embodiments, one or more warehouse maps 30 of the warehouse 110 associated with a database 28 may be stored in the memory 217. The system 200 can include one or more displays and/or output devices 204 such as monitors, speakers, headphones, projectors, wearable-displays, holographic displays, and/or printers, for example. Output devices 204 may be configured to output audio, visual, and/or tactile signals and may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The system 200 may further include one or more input devices 206 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 206 may further include cameras (with or without audio recording), such as digital and/or analog cameras, still cameras, video cameras, thermal imaging cameras, infrared cameras, cameras with a charge-couple display, night-vision cameras, three dimensional cameras, webcams, audio recorders, a laser scanner, a laser rangefinder, a 2D/3D mapping laser, a lidar, UWB sensors, and the like. For example, an input device 206 may include the UWB system 150, 160, 170 described herein.

As is noted above, the vehicle 100 can comprise or be communicatively coupled with the one or more processors 202. Accordingly, the one or more processors 202 can execute machine readable instructions to operate or replace the function of the operator controls. The machine readable instructions can be stored upon the memory 106, 217. Accordingly, in some embodiments, the vehicle 100 can be navigated automatically by the one or more processors 202 executing the machine readable instructions. In some embodiments, the location of the vehicle can be monitored by the localization system as the vehicle 100 is navigated.

As a non-limiting example, a navigation subsystem of the vehicle 100 may comprise one or more environmental sensors and an environmental database. In embodiments, the environmental sensors are configured to capture data indicative of a position of the vehicle 100 relative to the vehicle transit surface 122 in the warehouse 110. Further, the environmental database may reside on or be remote from the vehicle 100 and may comprise stored data indicative of the vehicle transit surface 122. The navigation subsystem may be configured to enable at least partially automated navigation of the vehicle 100 along the vehicle transit surface 122 utilizing the captured data and the stored data. For example, and not by way of limitation, it is contemplated that the navigation subsystem, the localization system, or both may utilize a stored warehouse map 30 and captured images of ceiling lights 114 or skylights 116 to enable navigation, localization, or both, as is disclosed in U.S. Pat. No. 9,174,830 issued on Nov. 3, 2015, U.S. Pat. No. 9,340,399 issued on May 17, 2016, U.S. Pat. No. 9,349,181 issued on May 24, 2016, U.S. Pat. No. 9,958,873 issued May 1, 2018, and other similar patents and patent publications. It is further contemplated that the navigation subsystem, a localization subsystem, or both may utilize a stored warehouse map 30 and a tag layout disposed on the vehicle transit surface 122 as disclosed in U.S. Pat. No. 9,811,088 issued on Nov. 7, 2017, and other similar patents and patent publications.

Additional suitable environmental sensors include, but are not limited to, inertial sensors, lasers, antennae for reading RFID tags, buried wires, WiFi signals, radio signals, global positioning system (GPS) sensors, global navigation satellite system (GNSS) sensors, ultra-wideband (UWB) sensors, or combinations thereof. By way of example and not as a limitation, UWB technology may be utilized for localization. UWB technology is a radio technology utilizing a low energy level for short-range, high-bandwidth communication over an ultra-wide radio spectrum portion, such as 3.1 to 10.6 GHz. UWB technology may include a transmitter on the materials handling vehicle 100 configured to transmit UWB transmissions for receipt by a receiver-anchor disposed in the warehouse 110. Such UWB transmissions generate radio energy at specific time intervals while occupying a large bandwidth at low energy levels and enable pulse-position or time modulation, and may modulate transmitted information on UWB pulse signals. As described below, an ability for the UWB technology to determine a time of flight (ToF) of the transmission at different frequencies may assist with measuring distances at a high resolution and accuracy for localization.

In embodiments described herein, UWB sensing utilizes UWB technology, such as UWB sensors, configured to implement radio technology via a pulse-based system that uses a low energy level for short-range, high-bandwidth communication over a broad portion of a radio spectrum, such as for transmission of information over a large bandwidth of greater than 500 MHz, or 20% of an arithmetic center frequency, as understood to one of ordinary skill in the art. Such UWB technology may employ time communication schemes such as use of Time of Flight (ToF) instead of signal strength measurement of electronic communications. UWB signals thus have very large bandwidths of at least 500 MHz (or a relative bandwidth of larger than 20%), have short duration waveforms, commonly transmit very short duration pulses with a low duty cycle (i.e., referable to as impulse radio), have a strong penetration capability (i.e., through walls) due to a large frequency spectrum, and may be realized in baseband (carrier-free) such that UWB pulses may be transmitted without a sine-wave carrier (i.e., non-sinusoidal). UWB signals may also be referenced as impulse radar, (time) impulse radio, non-sinusoidal signals, spread spectrum, and base band.

The UWB systems described herein may be employed with radio technologies such as UWB, radio frequency (RF), impulse modulated radio, RADAR, and/or active radar. The UWB systems herein may employ UWB antenna technology with antenna systems such as Multiple Input Multiple Output (MIMO), Multiple Input Single Output (MISO), and/or Single Input Multiple Output (SIMO). Further, the UWB systems may employ location measurement techniques including, but not limited to, Angle of Arrival (AoA), Time of Flight (ToF), Two-Way Ranging, and/or Time Difference of Arrival (TDoA).

In embodiments, a system may be a relative pose determination system and/or a field enforcement system. The system may include a first materials handling vehicle 100A and a second materials handling vehicle 100B, each materials handling vehicle 100 comprising a vehicle body. In an embodiment, each materials handling vehicle 100 may include a vehicle position processor 202, and each vehicle position processor 202 may be configured to perform functionalities as described herein. In another embodiment, the system may include a vehicle position processor 202 such as a central hub remote from the vehicles 100 that may be configured to perform the functionalities as described herein. The first and second materials handling vehicles 100A, 100B are configured to navigate a vehicle transit surface 122 in a warehouse environment of warehouse 110. The first materials handling vehicle 100A comprises a first ultra-wideband (UWB) antenna array mounted to the vehicle body, and the second materials handling vehicle 100B comprises a second UWB antenna array mounted to the vehicle body. The system may further include a plurality of vehicle wheels, a traction control unit, a braking system, and a steering assembly, and a navigation subsystem. The plurality of vehicle wheels support the vehicle body, the traction control unit, the braking system, and the steering assembly, are operatively coupled to one or more of the plurality of vehicle wheels, and the navigation subsystem is configured to cooperate with the traction control unit, the braking system, and the steering assembly to navigate the respective materials handling vehicle of the first and second materials handling vehicles 100A, 100B along the vehicle transit surface in the warehouse environment (e.g., surface 122 of the warehouse 110).

As described in greater detail below with respect to FIG. 3, the vehicle position processor 202 (which may reference throughout this disclosure each vehicle position processor 202 of a vehicle 100 or a vehicle position processor 202 separate from and communicatively coupled to the vehicles 100) may be configured to transmit respective UWB signals comprising vehicle information between respective UWB antenna arrays of the first and second materials handling vehicles 100A, 100B, and determine a relative pose of each of the first and second materials handling vehicles 100A, 100B with respect to each other based on transmitted UWB signals comprising the vehicle information. The vehicle position processor 202 may further be configured to cooperate with the navigation subsystem of the first and second materials handling vehicles 100A, 100B to navigate the at least one of the first and second materials handling vehicles 100A, 100B based on the relative pose.

Figure 3:
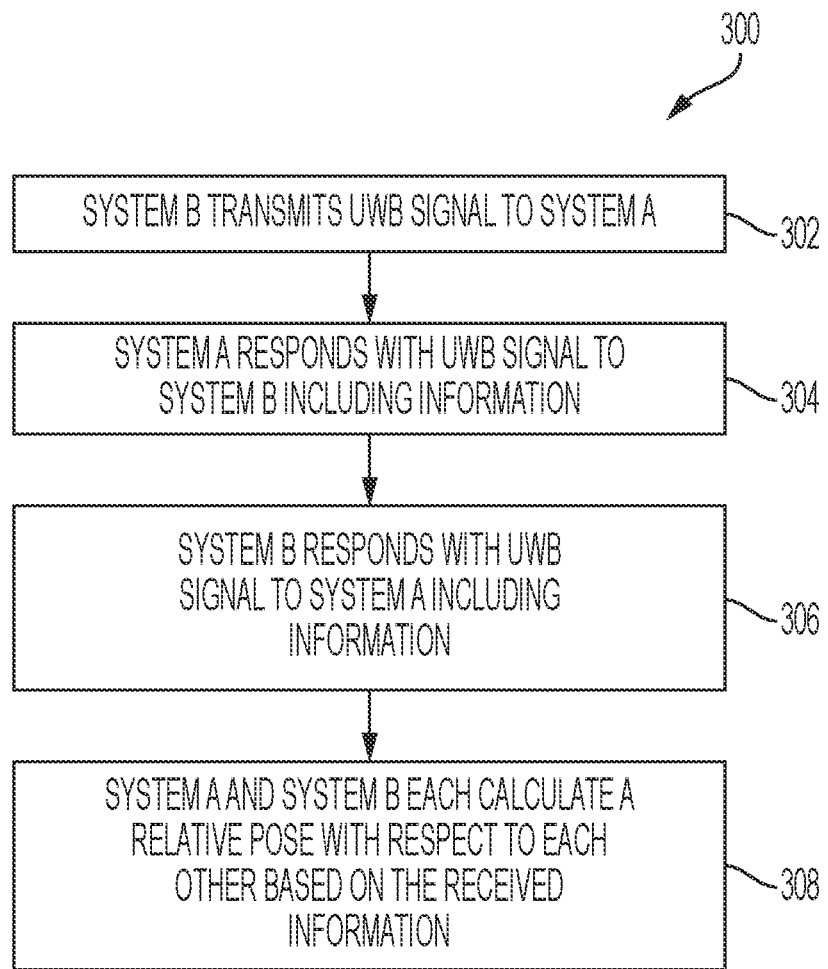
FIG. 3 depicts a flowchart overview of a method for pose or position determination between materials handling vehicles in a warehouse, according to one or more embodiments shown and described herein.

Referring to FIG. 3, the system 200 is configured to implement a process 300 through which a relative pose of a pair of vehicles 100 using a UWB antenna array mounted as UWB Systems 150A, 150B respectively to each vehicle 100 may be determined. As each UWB System 150A, 150B is configured to measure both a distance and an angle of received UWB signals, the signal and information exchanges may be utilized to sense the relative pose of the pair of materials handling vehicles 100 on which the UWB Systems 150A, 150B are respectively mounted, as described in greater detail below. Thus, the process 300 determines, through following machine-readable instructions, a relative pose of each of the material handling vehicles 100 of FIG. 1B in the warehouse 110 with respect to each other.

In block 302, and with reference to UWB system 160 of FIG. 1B, System B of UWB system 150B transmits a UWB signal to System A of UWB system 150A. System B emits the UWB signal that is received by each UWB antenna of System A. Each UWB system 150A, 150B is a multiple UWB antenna system with the antennas positioned in an array such that a center of the array is known and calibrated with respect to a center of the materials handling vehicle 100 on which the UWB system 150A, 150B is respectively mounted. System A receives the transmitted UWB signal and determines angle of arrival $\theta_1$ and may determine some time-of-flight information between System A and System B.

The vehicle position processor 202 may thus be configured to transmit a first UWB signal from the first UWB antenna array of the first materials handling vehicle 100A (e.g., System B) to the second UWB antenna array of the second materials handling vehicle 100B (e.g., System A), receive the first UWB signal at the second UWB antenna array of the second materials handling vehicle 100B (e.g., System A), and determine a second materials handling vehicle set of information (at System A) based on the first UWB signal. The second materials handling vehicle set of information may include an angle of arrival (e.g., angle of arrival $\theta_1$) and associated timing information based on the first UWB signal received at the second UWB antenna array. A determined distance (e.g., distance $d_1$) may be determined (at System B in block 306 described further below) based on the associated timing information such as time of flight information as a distance between a pair of nodes of the second materials handling vehicle and the first materials handling vehicle.

In block 304, System A responds with a UWB signal transmitted to System B including information. System A emits the UWB signal that is received by each UWB antenna of System B. The information includes the angle of arrival $\theta_1$ and associated timing information. Such timing information may be timestamped and utilized for a two-way ranging exchange to determine distance between nodes of the Systems A and B. In the two-way ranging exchange, a time of flight of a UWB radio-frequency (RF) signal may be determined and used to calculate a distance $d_1$ between nodes by, for example, multiplying the time by speed of light (e.g., based on calculating time of flight that is convertible to distance). System B receives the transmitted UWB signal and determines distance $d_1$ information between System B and System A.

The vehicle position processor 202 may thus be configured to transmit a second UWB signal comprising the second materials handling vehicle set of information from the second UWB antenna array of the second materials handling vehicle 100B (e.g., System A) to the first UWB antenna array of the first materials handling vehicle 100A (e.g., System B), and determine a first materials handling vehicle set of information (at System B) based on the second UWB signal. The first materials handling vehicle set of information may include an angle of arrival (e.g., angle of arrival $\theta_2$) and associated timing information based on the second UWB signal received at the first UWB antenna array. A determined distance (e.g., distance $d_2$) may be determined (at System A) based on the associated timing information such as time of flight information as a distance between a pair of nodes of the second materials handling vehicle and the first materials handling vehicle. Each UWB antenna array may include four nodes on each of the second materials handling vehicle 100B (e.g., System A) and the first materials handling vehicle 100A (e.g., System B). Each node of the first UWB antenna array and the second UWB antenna array may include a UWB antenna arranged and positioned in the respective UWB antenna array and mounted on the vehicle body such that a center of the respective UWB antenna array is calibrated with respect to a center of the respective materials handling vehicle on which the respective UWB antenna array is mounted and a relative offset of each UWB antenna to the center of the respective materials handling vehicle.

In block 306, System B responds with a UWB signal transmitted to System A including information. The information includes the angle of arrival $\theta_2$ and associated timing information. Such timing information may include time of flight information to be utilized for the two-way ranging exchange and that is timestamped. In the two-way ranging exchange, a time of flight of a UWB radio-frequency (RF) signal may be determined and used to calculate a distance $d_2$ between nodes by, for example, multiplying the time by speed of light (e.g., based on calculating time of flight that is convertible to distance). System A receives the transmitted UWB signal and determines distance $d_2$ information between System B and System A. Thus, both of System A and System B receive mutually received information including angle of arrival information of the UWB signals and distance between each system as measured from the other system. The vehicle position processor 202 may be configured to transmit a third UWB signal comprising the first materials handling vehicle set of information from the first UWB antenna array of the first materials handling vehicle 100A (e.g., System B) to the second UWB antenna array of the second materials handling vehicle 100A (e.g., System A).

In block 308, System A and System B respectively calculate a relative pose with respect to one another based on the mutually received information. Thus, the UWB antenna arrays respectively mounted as Systems A and B on each materials handling vehicle 100 are cooperatively used to sense the relative pose on both Systems A and B. By each of System A and System B determining a relative pose with respect to one another, the UWB system 160 may be used as a sensor system for enforcing speed limits and/or halting vehicle movements in hazardous conditions when the UWB system 160 detects two or more vehicles 100 are operating too close to one-another. The UWB system 160 may thus detect the full relative pose of one vehicle 100 to a high degree of accuracy and read other information from another vehicle 100 in order to determine if the pair of vehicles 100 are in a hazardous scenario with respect to one another and to take a preventative action accordingly (e.g., stopping, slowing, turning, automatic braking, active cruise control, or other collision avoidance action). The vehicle position processor 202 may thus be configured to determine a relative pose of each of the first and second materials handling vehicles 100A, 100B with respect to each other based on the second UWB signal and the third UWB signal, and navigate at least one of the first and second materials handling vehicles based on the relative pose.

The relative pose may include a first vehicle pose and a second vehicle pose. The first vehicle pose may include a pose (i.e., position and orientation) of the first materials handling vehicle 100A relative to the second materials handling vehicle 100B based on the first materials handling vehicle set of information, and the second vehicle pose may include a pose (e.g., position and orientation) of the second materials handling vehicle 100B relative to the first materials handling vehicle 100A based on the second materials handling vehicle set of information. The first materials handling vehicle 100A may be configured to determine the second vehicle pose comprising the pose of the second materials handling vehicle 100B relative to the first materials handling vehicle 100A based on at least the second materials handling vehicle set of information transmitted with the second UWB signal. The second materials handling vehicle 100B may be configured to determine the first vehicle pose comprising the pose of the first materials handling vehicle 100A relative to the second materials handling vehicle 100B based on at least the first materials handling vehicle set of information transmitted with the third UWB signal. The relative poses may further be based on extra data, such as at least relative coordinates of transmitting nodes on each vehicle 100A, 100B (e.g., the relative coordinates of transmitting nodes of the each UWB antenna array of each vehicle 100A, 100B).

In embodiments, each of the first and second materials handling vehicle 100A, 100B are sensed to be constrained within an aisle, which may be a very-narrow aisle (VNA) in a warehouse, for example, such as when both vehicles are actively being wire guided. When each of the first and second materials handling vehicle 100A, 100B are sensed to be constrained within an aisle, each vehicle position processor 202 may be configured to independently determine an angle offset from a shared parallel structure, such as racking, embedded magnetic wires, and the like, and adjust a relative angle based on the angle offset and relative pose between the vehicles 100 to a closest angle configured to place the vehicles 100 in parallel. Thus, when each of the first and second materials handling vehicle 100A, 100B are wire guided, at least one or each vehicle position processor 202 is configured to adjust a relative angle based on the relative pose between the vehicles 100 to a closest angle configured to place the vehicles 100 in parallel. The angular offset may thus be used to correct the angle component of the relative pose for potential higher accuracy. Further, additional vehicle information can be sent in the locating signals. For man-up vehicles that have antennas mounted on the movable platform, such information may include lift height used for determining an accurate range from the two-way-ranging algorithm. Multiple systems may re-use some of these UWB signals for their own measurement of relative poses. A single UWB message may be used by multiple remote vehicle systems to calculate relative poses simultaneously where, for example, multiple associated timing information is sent for multiple respective vehicle systems. Further, integration and transfer of lift height information between the Systems A and B may allow for the placement of antennas of the Systems A and B on the lifting portions of the materials handling vehicles 100 on which the systems are respectively mounted.

The system 200 utilizing the UWB system 170 of FIG. 1C may operate with only one side having an antenna array. Such a mode may be utilized for pedestrian tracking applications such as through an ability to degrade to support pedestrians without utilizing an antenna array and/or with the relative position observation configuration of FIG. 1C when an operating compartment is at a height such that an associated UWB antenna array has a blindspot due to the operating compartment height. The process employed for the UWB system 170 is similar to the process 300 described with respect to the UWB system 160 except single antenna System B does not measure or respond with an angle of arrival. System A will only have the relative position of single antenna System B and thus will not be able to sense the direction the system is facing to determine an orientation and thus pose of System B. Further, System B will only be able to determine a relative distance between the two systems.

With respect to the UWB system 170 of FIG. 1C, blocks 302, 304 may be utilized. Single antenna System B transmits a UWB signal to System A (e.g., UWB system 150A) in block 302. System A responds with a UWB signal transmitted to the single antenna System B including information such as angle of arrival θ and timing information in block 304. However, as System B is a single antenna system and is not calibrated with respect to a center of an antenna array and a center of a materials handling vehicle, System A is configured to measure a relative position (and not orientation) of System B, and System B measures a relative distance d to System A.

In some embodiments described herein, such as with respect to the UWB system 160 of FIG. 1B, the system 200 utilizing the UWB system 160 does not require UWB radios mounted to infrastructure to operate but rather mounts UWB antenna arrays as UWB Systems 150A, 150B to respective materials handling vehicles 100. Such a vehicle mounting system not dependent on infrastructure mounting may reduce a complexity of a commissioning process of a new installation and avoid expensive infrastructure installation and mapping exercises. Such a vehicle mounting system may further add confidence to safe control of the vehicles as a remote server is not required to be involved in sensing other vehicles. Further, through relative pose sensing between vehicles using the UWB Systems 150A, 150B respectively mounted to materials handling vehicles 100, a relative pose in addition to a distance of one system to another may be sensed to provide more accurate pose determination and lead to less false positive triggers of detection of hazardous situations (e.g., a pair of vehicles 100 being determined to be too close to one another and at risk of collision).

The sensing methods per the UWB systems described herein enables control of a materials handling vehicle 100 employing a UWB system 150 based on the determined position and orientation (e.g., pose) of other materials handling vehicles 100. Such control enables more accurate identification of hazardous scenarios and limitation of speed only when required to keep false triggers of the system to a minimum. The UWB systems also enable small data transfers between the systems of the materials handling vehicles 100 for use in identifying hazardous scenarios.

As described in greater detail below with respect to FIGS. 4-8, the UWB systems described herein may further be used to achieve accuracy of materials handling vehicle intrusion protection through detecting and taking control of actions on overlapping fields via the UWB radio system mounted to each vehicle. A UWB radio system 150 mounted on a materials handling vehicle 100 is configured to sense other materials handling vehicles 100 in an immediate area that could potentially intrude on a current path of the materials handling vehicle 100. The UWB radio system 150 may further be configured to determine which of the detected materials handling vehicles 100 would, given a respective current trajectory, be likely to lead to an overlap of field zones and a potential hazardous scenario such as a collision between the vehicles. As a non-limiting example, another vehicle 100 intruding on the path of the materials handling vehicle 100 may be likely to lead to collision. The system 200 may utilize vehicle controllers communicatively coupled to the UWB radio system 150 of respective vehicles 100 to enforce a control action on one or both systems 150 to reduce a risk of the hazardous scenario. Such a control action may be lowering the travel speed of or stopping a vehicle 100 altogether.

The relative poses of neighboring vehicles 100 that the UWB localization system described herein produces may each be used as an input for a performance rated system of hardware and software as described herein that execute various safety functions to detect hazardous scenarios and command the necessary control actions of vehicles 100.

Figure 4:
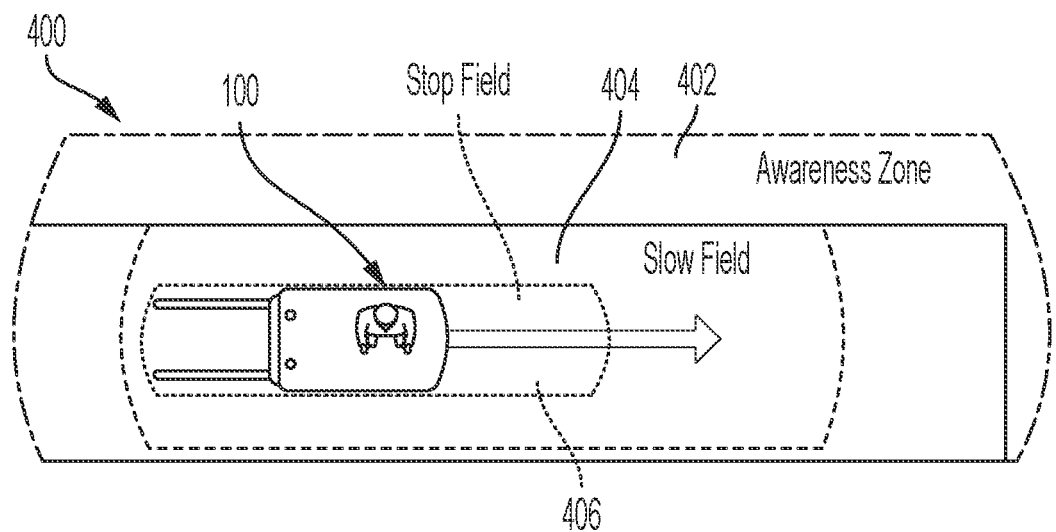
FIG. 4 depicts fields of a materials handling vehicle, according to one or more embodiments shown and described herein.

Referring to FIG. 4, a materials handling vehicle 100 is shown with one or more fields 400. To detect such hazardous scenarios, a hazardous scenario likelihood may be based on a current trajectory of a materials handling vehicle 100 and the one or more fields 400 of the materials handling vehicle 100, which fields may overlap. The one or more fields 400 may also be referenced as zones herein. The one or more fields 400 are dynamic virtual boundaries outlining peripheries of virtual zones surrounding the materials handling vehicle 100. The dynamic virtual boundaries are adjustable such that field shapes and/or sizes are selected based on velocity, steer wheel measurements, or combinations thereof with respect to the materials handling vehicle. In embodiments, field shapes and/or sizes may be selected from predefined sets based on velocity, steer wheel values, or combinations thereof for the materials handling vehicle 100. The shape and dimensions of the one or more fields 400 may change based on a current speed of the materials handling vehicle 100, steer wheel angle, wire-guidance engagement status, lift height, or combinations thereof. A distinct set of these fields 400 may be pre-programmed and pre-loaded on the systems described herein. In embodiments, the one or more fields may be calculated in real-time.

With respect to FIG. 4, the materials handling vehicle 100 includes an awareness zone 402, a slow field 404, and a stop field 406 of decreasing surface area and periphery surrounding the materials handling vehicle 100. The stop field 406 overlaps with a portion of the larger slow field 404. Both the stop field 406 and the slow field 404 are within the awareness zone 402. Thus, in embodiments, the stop field overlaps with a portion of the slow field, the slow field being larger than the stop field. The stop field and the slow field may both be within the awareness zone 402. The awareness zone 402 is representative of a zone about (e.g., surrounding) the materials handling vehicle 100 in which the materials handling vehicle is configured to detect one or more field infringements, obstacles, or combinations thereof. Such obstacles may be virtual fields, another materials handling vehicle 100, or combinations thereof.

The stop field 406 may be configured to cover an area swept via a sensing by the materials handling vehicle 100 when traveling at a minimum limited speed such that the system or operator can safely stop the materials handling vehicle 100 to a stop. The slow field 404 may be defined as an area on top of and greater than the stop field 406 that is swept via a sensing by the materials handling vehicle 100 to decelerate to a minimum limited speed. Thus, the stop field 406 may be representative of an area for vehicular travel at a minimum speed limit and the slow field 404 is representative of an area of vehicular travel in which the respective materials handling vehicle 100 would be reduced to the minimum speed limit. The slow field 404 and the stop field 406 may be configured to cooperate to reduce a likelihood of a hazardous situation by alerting an operator of the materials handling vehicle 100, automatically slowing or stopping the vehicle 100, or combinations thereof.

In embodiments, and as described in greater detail below with respect to FIG. 5, the vehicle position processor 202 is configured to determine a first virtual field for the first materials handling vehicle 100A and a second virtual field for the second materials handling vehicle 100B, determine a field infringement occurrence when a portion of the first virtual field overlaps a portion of the second virtual field based on the relative pose, and operate at least one of the first and second materials handling vehicles 100A, 100B based on the field infringement occurrence. In embodiments, and as described in greater detail below, at least one of the first and second materials handling vehicles 100A, 100B may be configured to slow or stop based on the field infringement occurrence.

Figure 5:
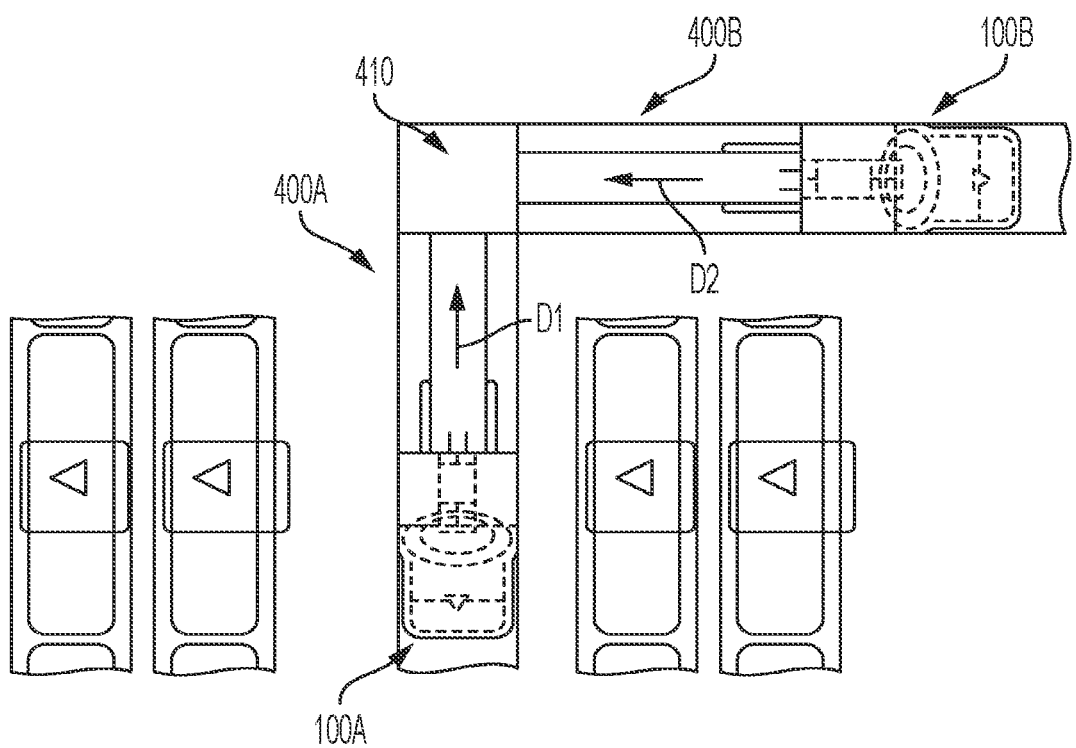
FIG. 5 depicts overlapping fields between a pair of materials handling vehicles, according to one or more embodiments shown and described herein.

Referring to FIG. 5, field infringement of a materials handling vehicle 100A by another materials handling vehicle 100B or field 400B of the other materials handling vehicle 100B that infringes upon a portion of a field 400A may be detected by the system 200. The materials handling vehicles 100A, 100B may be traveling along respective trajectories as represented by directional arrows D1, D2.

The location data described herein contains relative pose information between two vehicle systems. With such vehicle pose information, both vehicles can operate with respective small detection fields than relying on range data alone that may be provided by other UWB solutions and therefore trigger fewer false positives. The other UWB solutions relying on range data alone may generate large detection fields prone to false positive detection. The UWB systems described herein minimize a detection field geometry of a respective vehicle 100 to an extent that the field 400 remains long enough for the required stopping distance. Additionally, a factor of safety may be input, and the field 400 can be shaped to cover only an area the vehicle 100 will travel through. A weight, velocity of the vehicle 100, velocity, acceleration profiles, brake performance coefficients, and predicted system latency, or combinations thereof, may be utilized to determine a required stopping distance of the vehicle 100. A field enforcement system 200 as described herein may use the velocity, steer wheel angle, wire guidance status, fork height, or combinations thereof as an input to generate or look-up a set of predefined field shapes for the field 400 required to safely avoid hazards. Each of the first and second virtual fields may be one of a static field or a dynamic field. The dynamic field may be configured to adjust size, shape, or both based on vehicle velocity, relative pose, steer direction, fork or operator compartment lift height, wire guidance status, vehicle model type, load weight, or combinations thereof.

The UWB field enforcement system 200 described herein can also detect and reduce the risk of certain scenarios that a laser-based system alone may be unable to detect until it was too late. Such laser-based solutions alone may require sensing of a physical obstacle before a control action can be applied, which sensor limitation may lead to fields that are much larger than needed for the UWB field enforcement system 200 for hazard reduction. Thus, the UWB field enforcement system 200 described herein is configured to sense virtual obstacles such as a field infringement by overlapping virtual fields of a pair of materials handling vehicles 100A, 100B as shown in FIG. 5.

In the embodiment shown in FIG. 5, the materials handling vehicle 100A may be traveling along directional arrow D1 in an aisle defined between warehouse racking to exit the aisle at an aisle end, and the materials handling vehicle 100B may be traveling in a perpendicular direction defined by directional arrow D2 approaching the aisle end such that a field infringement is possible between the vehicles 100A, 100B.

The field infringement of fields 400A, 400B of the materials handling vehicles 100A, 100B is shown as an overlapping field infringement 410 in FIG. 5. The system 200 described herein may use the relative position and/or pose of the other materials handling vehicle 100B, as supplied by a UWB location system 150, and reported fields 400B of the other materials handling vehicle 100B to place the fields 400A, 400B relative to one-another and check for infringement. Such an infringement check may be a simple intersection check between the one or more fields 400A, 400B of each of the materials handling vehicles 100A, 100B. In embodiments, each field 400 only infringes with like fields.

Thus, the stop field 406 infringes only with other stop fields, and the slow field 404 infringe only with other slow fields. Hence, the field infringement occurrence may be determined when the portion of the first virtual field overlapping the portion of second virtual field comprise matching field types comprising an awareness field type, a slow field type, and a stop field type. In embodiments, each of the first and second virtual fields may include a field type, which may be a slow field, or a stop field.

Once a field infringement has been detected by a materials handling vehicle 100, the onboard hardware and software may emit proper control signals for the materials handling vehicle 100 to avoid collision. In embodiments, other vehicle systems that are also running similar algorithms may be likewise detected and have begun respective control actions. In an event that an error leads to the other vehicle 100 not detecting infringement, the vehicles 100 may monitor an infringement status of neighboring vehicles 100. If another vehicle 100 reports that respective fields of the vehicle 100 are infringing onto the fields of a materials handling vehicle 100, the materials handling vehicle 100 may also begin control actions as if the materials handling vehicle 100 had detected the infringement.

Figure 6:
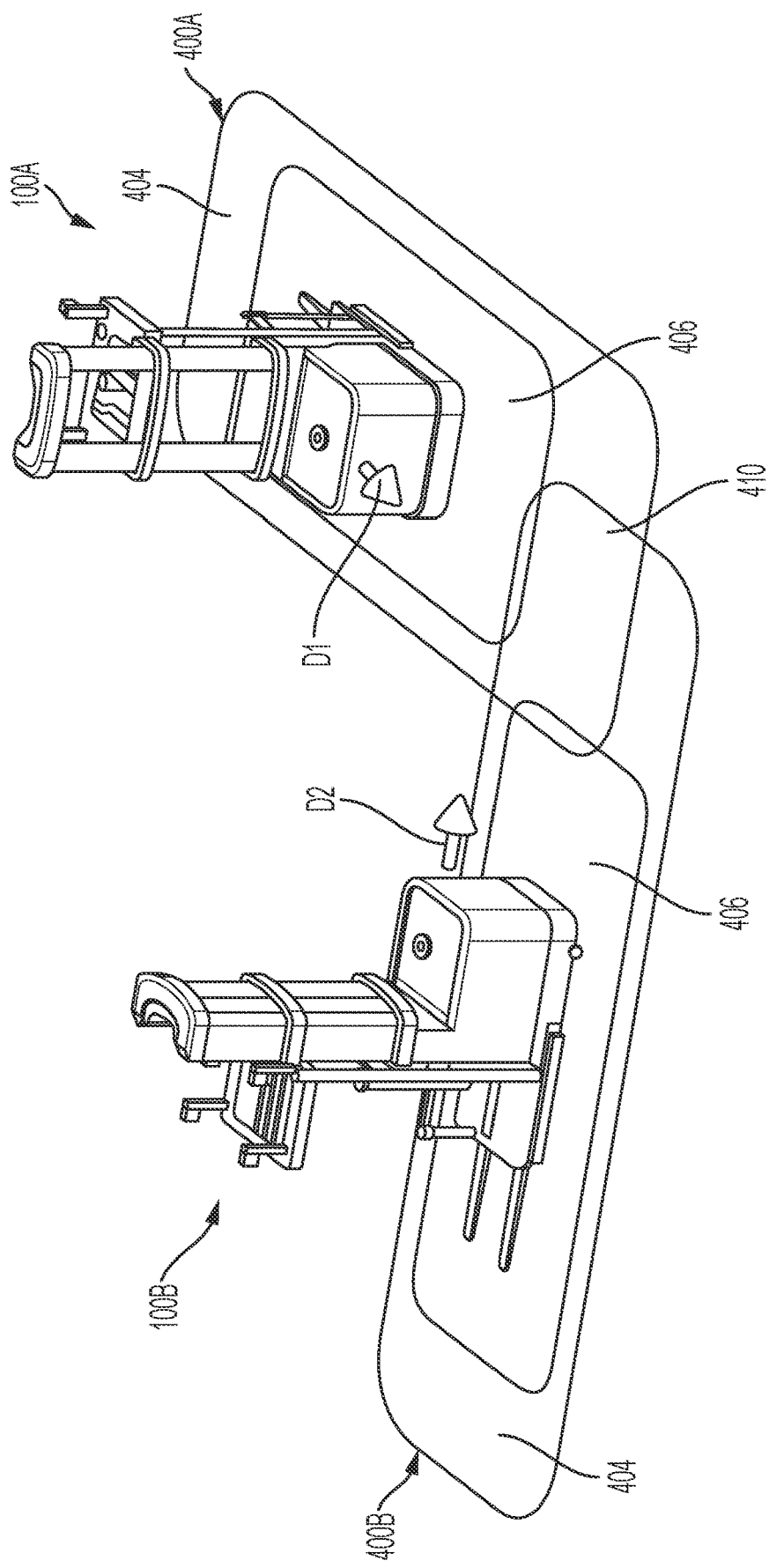
FIG. 6 depicts multiple overlapping fields between a pair of materials handling vehicles, according to one or more embodiments shown and described herein.

Referring to FIG. 6, the overlapping field infringement 410 may include overlapping portions of at least two fields 400 of the materials handling vehicles 100A, 100B. As a non-limiting example, the overlapping field infringement 410 may include overlapping portions of stop fields 406 and the slow fields 404 of each of the materials handling vehicles 100A, 100B.

The UWB field enforcement system 200 described herein may work within a predefined range of safe speed limit enforcement set points that can be configured, such as by an end user or a service technician. A combination of the stop field 406 and the slow field 404 and system behavior in each field 406, 404 and detection of overlap with virtual obstacles such as other virtual vehicle fields 400 as described herein aids to give an operator enough time to act. For example, the operator may have enough time to act and reduce a risk of the hazard by slowing the vehicle 100 rather than having to completely stopping the vehicle 100.

In embodiments, an overlapping of any two slow fields 404 of vehicles 100A, 100B may lead to a safely controlled deceleration of both vehicles 100A, 100B. The overlapping of any two stop fields 406 of vehicles 100A, 100B may lead to a controlled braking of the traction control motor of at least one of the vehicles 100A, 100B so to come to either a stop or to slow to a set speed. In an embodiment, a field infringement occurrence may be determined based on an overlap of the stop fields 406, and the first and second materials handling vehicles 100A, 100B are each configured to decelerate based on the field infringement occurrence. When the field infringement occurrence is determined based on an overlap of the stop fields 406 for each the first and second materials handling vehicles 100A, 100B, at least one of the first and second materials handling vehicles 100A, 100B may be set to operate at a maximum speed of 1.0 or 0.5 miles per hour based on the overlap.

Figure 7:
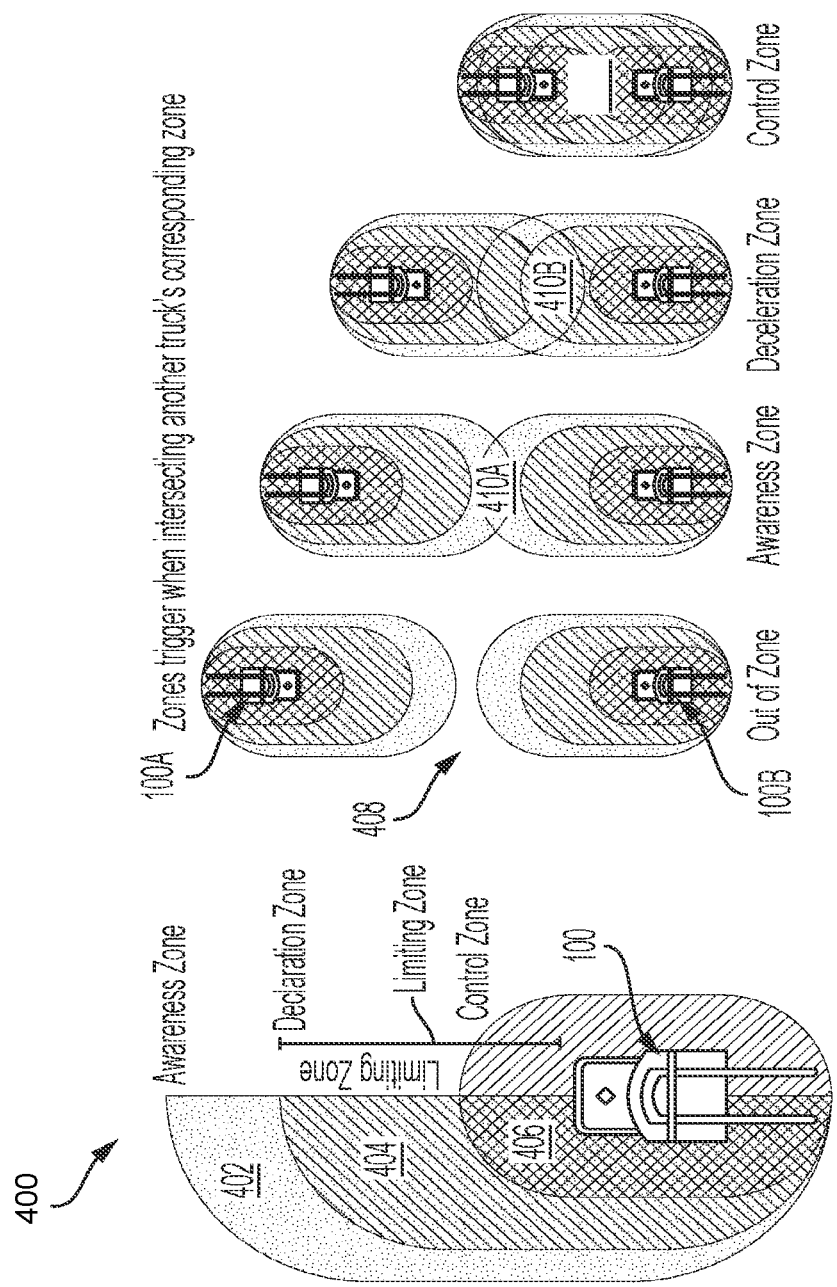
FIG. 7 depicts types of field overlap between a pair of materials handling vehicles, according to one or more embodiments shown and described herein.

Referring to FIG. 7, different types of field overlap are shown between a pair of materials handling vehicles 100A, 100B. In FIG. 7, a control zone is depicted as the stop field 406 and a deceleration zone is depicted as the slow field 404. A larger awareness zone 402 encompasses both the control zone and the deceleration zone. Vehicle restrictions may be set when infringement is detected in the control zone and the deceleration zone. In embodiments, for the control zone, a sensed field infringement may result in maintaining a maximum speed such as 1.0 miles per hour (mph) for the vehicle 100. The control zone as the stop field 406 may be static and of a fixed size and shape. In other embodiments, the control zone may be dynamic. For the deceleration zone as the slow field 404, a sensed field infringement may result in progressively reducing vehicle speed to the maximum speed of 0.5 mph as distance to a closest vehicle 100 sensed by the field infringement decreases. In an embodiment, the deceleration zone may be dynamic to adjust size and/or shape of the slow field 404 based on vehicle velocity and steer direction. For the awareness zone 402, a sensed field infringement may not affect behavior of the vehicle 100 but may be used to trigger internal communication within the vehicle 100, external communication with other systems or vehicles 100, or combinations thereof. In embodiments, the awareness zone 402 may be replaced by specific conditions utilizing UWB data sensed by the UWB systems 150 as described herein.

Thus, the different types of field overlap of FIG. 7 between a pair of materials handling vehicles 100A, 100B may trigger different vehicle reactions. In an Out of Zone scenario, none of the fields 400 of the vehicles 100A, 100B overlap and rather are spaced by a non-overlap area 408. In an Awareness Zone Overlap scenario, a pair of awareness zones 402 of the vehicles 100A, 100B overlap as an overlapping field infringement 410A to trigger internal and/or external communications. In a Deceleration Zone Overlap scenario, a pair of deceleration zones (e.g., slow fields 404) of the vehicles 100A, 100B overlap as an overlapping field infringement 410B to progressively reduce vehicle speed to a maximum speed. In a Control Zone Overlap scenario, a pair of deceleration zones (e.g., stop fields 406) of the vehicles 100A, 100B overlap as an overlapping field infringement 410B to maintain the maximum speed, stop at least one of the vehicles 100A, 100B, or redirect at least one of the vehicles 100A, 100B to avoid collision.

Figure 8:
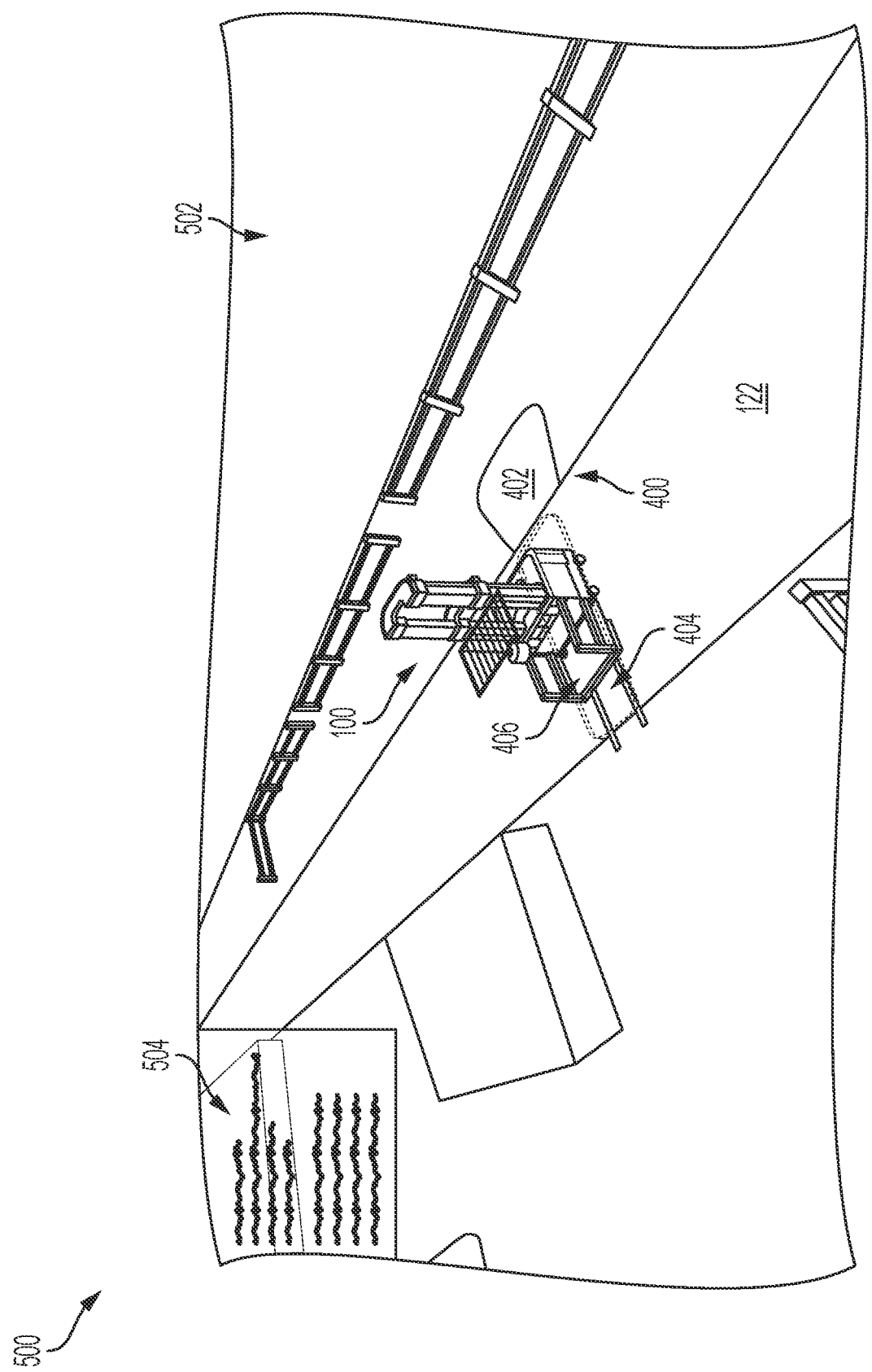
FIG. 8 depicts a display of a materials handling vehicle including field and operational information, according to one or more embodiments shown and described herein.

Referring to FIG. 8, a display 500 of a materials handling vehicle 100 of the inventory transit surface 122 is shown. The display 500 includes a display on a graphical user interface (GUI) 502 of the one or more fields 400 of the materials handling vehicle 100 such as the awareness zone 402, the slow field 404, and the stop field 406. The display 500 may display a current field infringement as quadrants on the GUI 502 to give an operator a clear and quick reference to a direction of the infringing vehicle 100. The display 500 further includes operational information 504 of the materials handling vehicle shown on the GUI 502, which operational information may be used to dynamically adjust field shape as described herein. The operational information 504 displayed may include current speed and steer wheel angle, and a vehicle assigned slow field identification and stop field identification.

The field enforcement systems for materials handling vehicles as described herein may also be used in a very narrow aisle (VNA) warehouse as the warehouse house 110 that may include one or more powered industrial trucks as the materials handling vehicles 100 described herein.

Figure 9:
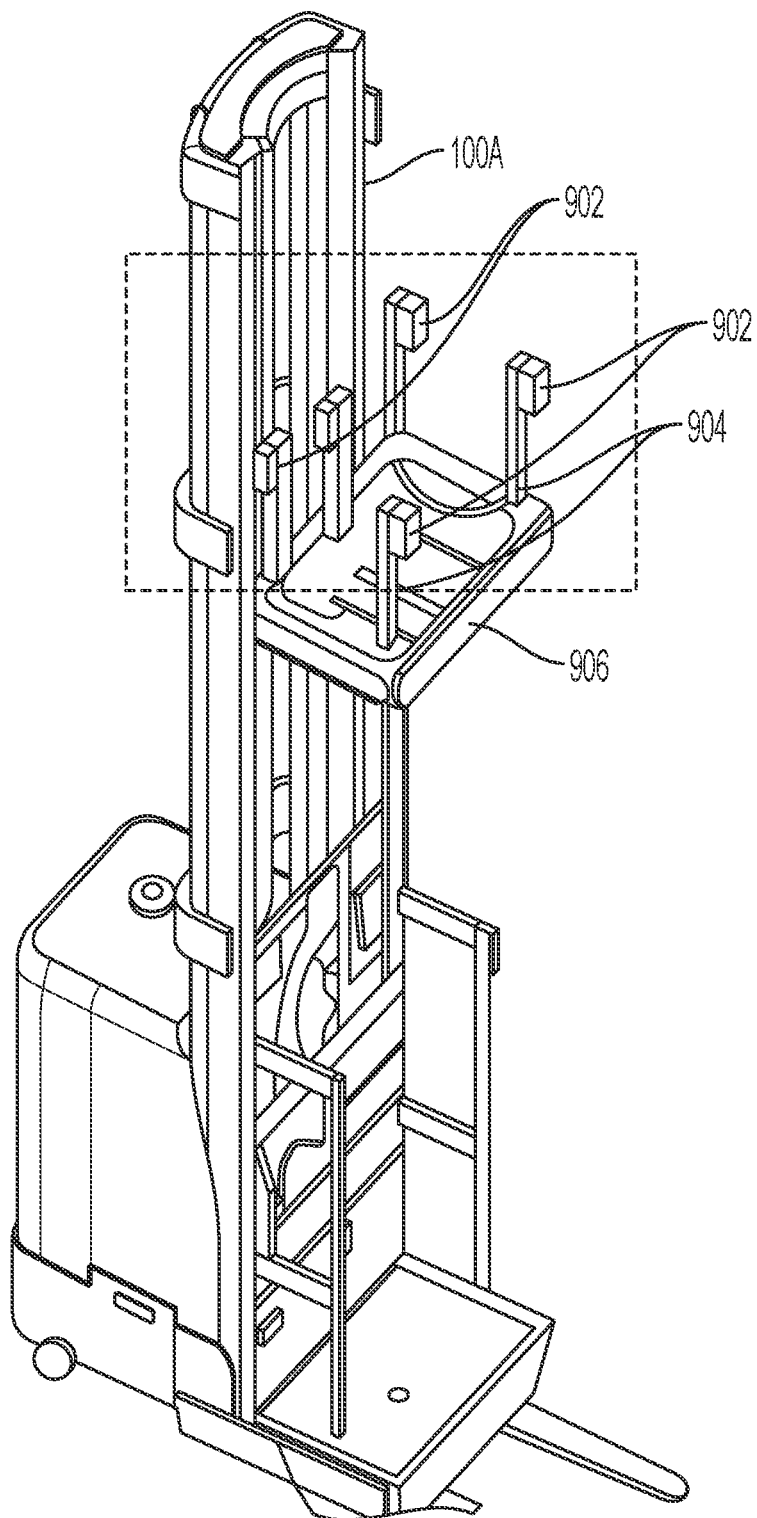
FIG. 9 depicts a materials handling vehicle including a first mounted UWB antenna array system including a plurality of enclosures.

Referring to FIG. 9, a materials handling vehicle 100A is shown including a first mounted UWB antenna array system that includes a plurality of enclosures 902 mounted on a vehicle frame 906 such as an overhead guard via supporting elements 904. Each enclosure 902 includes a UWB antenna disposed therein. Each enclosure 902 or other enclosures as described herein may represent a node. Thus, the first and second UWB antenna arrays as described herein may include one or more nodes, each node comprising a UWB antenna arranged and positioned in the respective UWB antenna array and mounted on the vehicle body such that a center of the respective UWB antenna array is calibrated with respect to a center of the respective materials handling vehicle 100 on which the respective UWB antenna array is mounted.

The supporting elements 904 may extend from portions of the vehicle frame 906 or other vehicle portions in various angles or shapes. In FIG. 9, the support elements 904 extend in a vertical upward direction from corners of the vehicle frame 906 shown as an overhead guard. The supporting elements may be made of the same material as the overhead guard 906, such as fabricated steel, to have the same level of durability and sturdiness. The enclosures 902 may be transparent and formed from various non-occlusive materials, such as glass-filled nylon, rigid structural plastic, polyethylene, fiberglass, various rubber coated materials, non-metallic and non-ferrous materials, and the like to prevent occlusion of the signals from and to the UWB antennas disposed therein.

Figure 10:
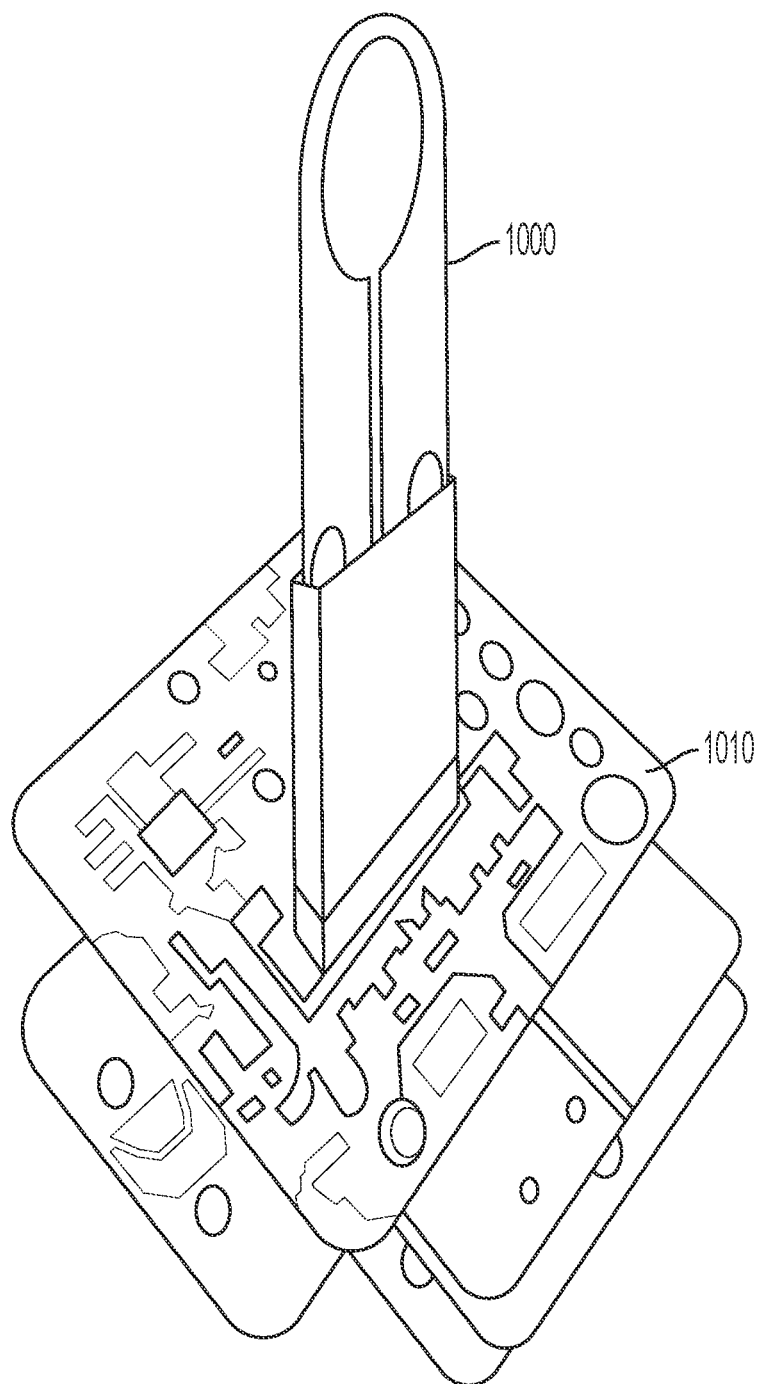
FIG. 10 depicts a UWB antenna as disposable in an enclosure of FIG. 9.

Each UWB antenna described herein includes a PCB including a PCB longitudinal axis, an antenna feature comprising an antenna longitudinal axis aligned in parallel with (as shown in and described below for FIG. 12-13) or perpendicular to (as shown in and described below for FIG. 10) the PCB longitudinal axis, and an antenna enclosure shaped and sized to receive the PCB and the antenna feature. For instance, FIG. 10 shows an embodiment of a UWB antenna that may be disposed in an enclosure 902 of FIG. 9. The UWB antenna includes an antenna feature 1000 and a printed circuit board (PCB) 1010. The antenna feature 1000 is configured to transmit and receive signals, such as UWB signals, from other antennas. The PCB 1010 is configured to analyze and/or process the signals. The antenna feature 1000 includes an antenna longitudinal axis aligned perpendicular to the PCB longitudinal axis.

Figure 11:
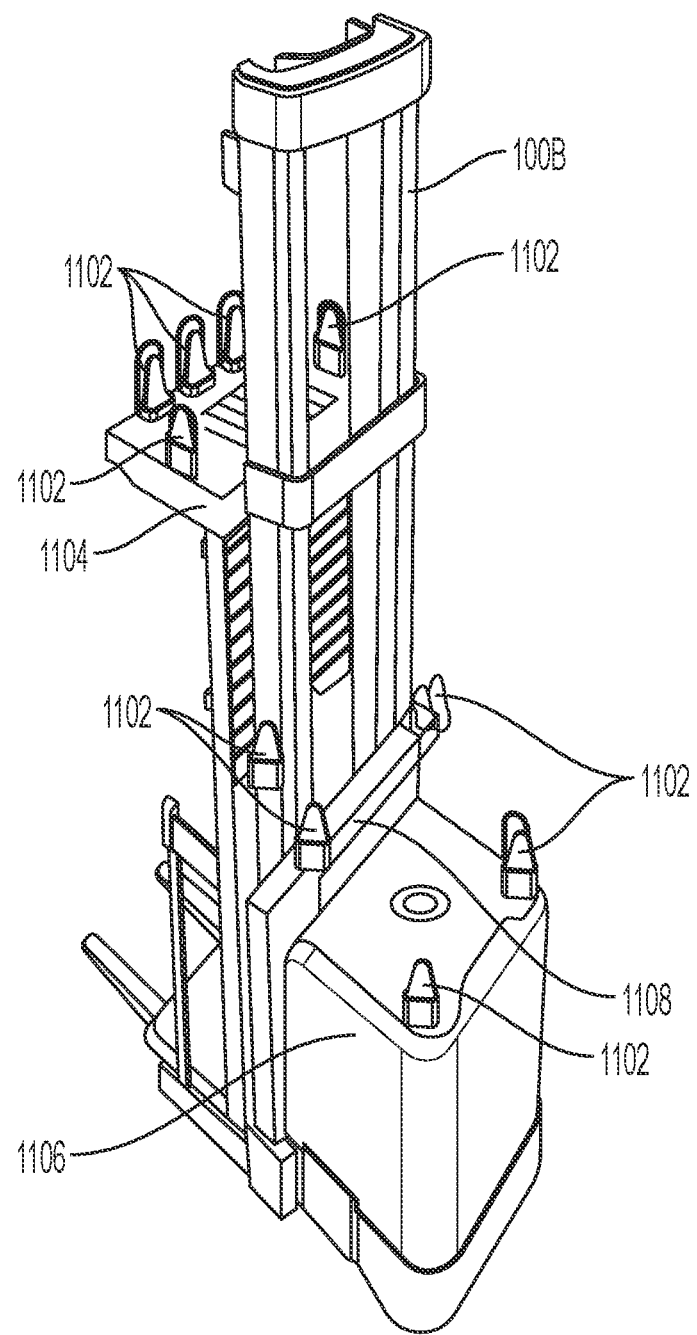
FIG. 11 depicts a materials handling vehicle including a second mounted UWB antenna array system including a plurality of enclosures.

In FIG. 11, a materials handling vehicle 100B is shown including a second mounted UWB antenna array system that has a plurality of enclosures 1102. One or more of the enclosures 1102 may be mounted on an overhead guard 1104, while other enclosures 1102 may be positioned at various other vehicle locations, such as on a power unit module 1106 or on a mast crossbrace 1108 of the materials handling vehicle 100B.

Figure 12:
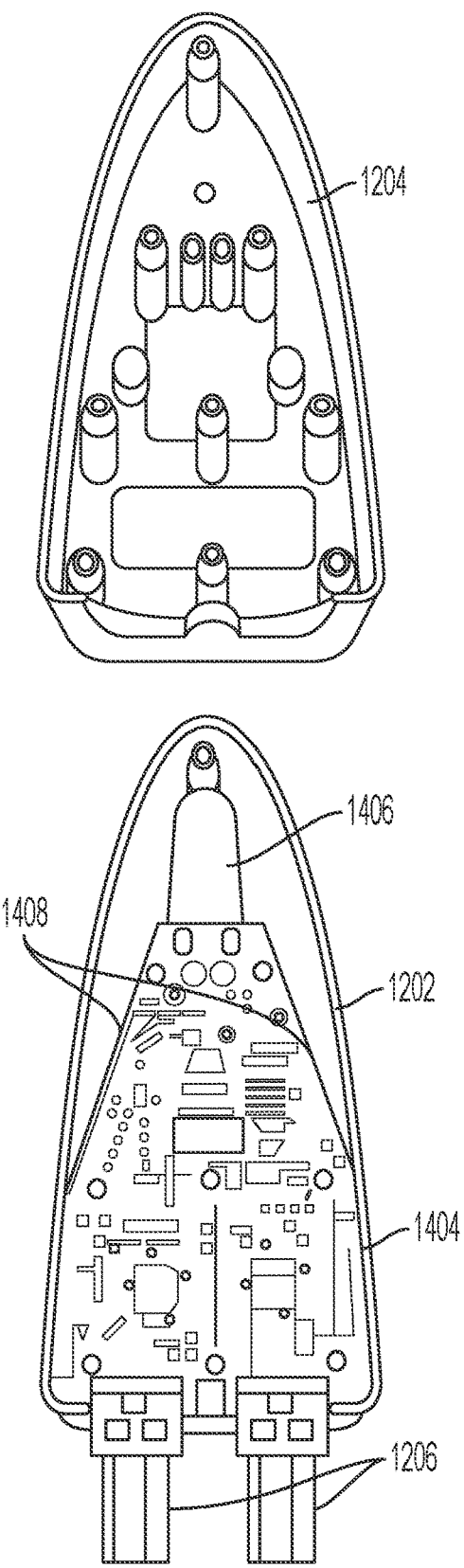
FIG. 12 depicts a UWB antenna disposed in a first enclosure.

In FIG. 12, a first type of UWB antenna disposed in a first type of enclosure 1102 is shown along with an interior of the enclosure 1102 of FIG. 11. The enclosure 1102 includes a front cover 1202, a back cover 1204, a PCB 1404, an antenna feature 1406, and connector port housings 1206. The back cover 1204 is configured to attach to the front cover 1202. At least one of the back cover 1204 and the front cover 1202 may include curved wall portions defining at least a portion of an aperture sized and shaped to receive the connector port housings 1206. The antenna enclosures described herein may thus include a wall defining a pair of apertures to receive mounting prongs as the connector port housings 1206 extending from the PCB 1404. When the wall longitudinal axis of wall is disposed perpendicular to with the PCB longitudinal axis as shown in FIG. 12, the mounting prongs extend in parallel with the PCB longitudinal axis to mount to the vehicle body at a zero-degree angle. When a wall longitudinal axis of wall is disposed in parallel with the PCB longitudinal axis as shown in FIG. 13, the mounting prongs extend perpendicular to the PCB longitudinal axis to mount to the vehicle body at a ninety-degree angle.

Referring again to FIG. 12, both the back cover 1204 and the front cover 1202 include curved wall portions defining at least a portion of an aperture such that, when attached, a pair of apertures at an end of the enclosure 1102 is sized and shaped to receive the connector port housings 1206. The connector port housings 1206 are shown to attach directly to the PCB 1404, which includes tapered portions 1408 on upper side walls. The antenna feature 1406 is shown to be positioned at an apex above the tapered portions 1408 along a PCB longitudinal axis. The antenna feature 1406 includes an antenna longitudinal axis aligned in parallel with the PCB longitudinal axis. The shape and positioning of the tapered portions 1408 and antenna feature 1406 aid to provide a teardrop shape, which a teardrop shape of the enclosure 1102 is sized and shaped to receive, to prevent or reduce signal interference. Each UWB antenna comprising the antenna feature 1406 with the antenna longitudinal axis aligned in parallel with the PCB longitudinal axis may include a teardrop shape included tapered in sidewalls (e.g., the tapered portions 1408) of the PCB 1404 with the antenna feature 1406 disposed at a shortest end (e.g., apex) of the tapered sidewalls. The connector port housings 1206 may include connectors configured to be mounted or connected to external electrical connectors that may be positioned on various parts of the materials handling vehicle 100B as described herein.

Figure 13:
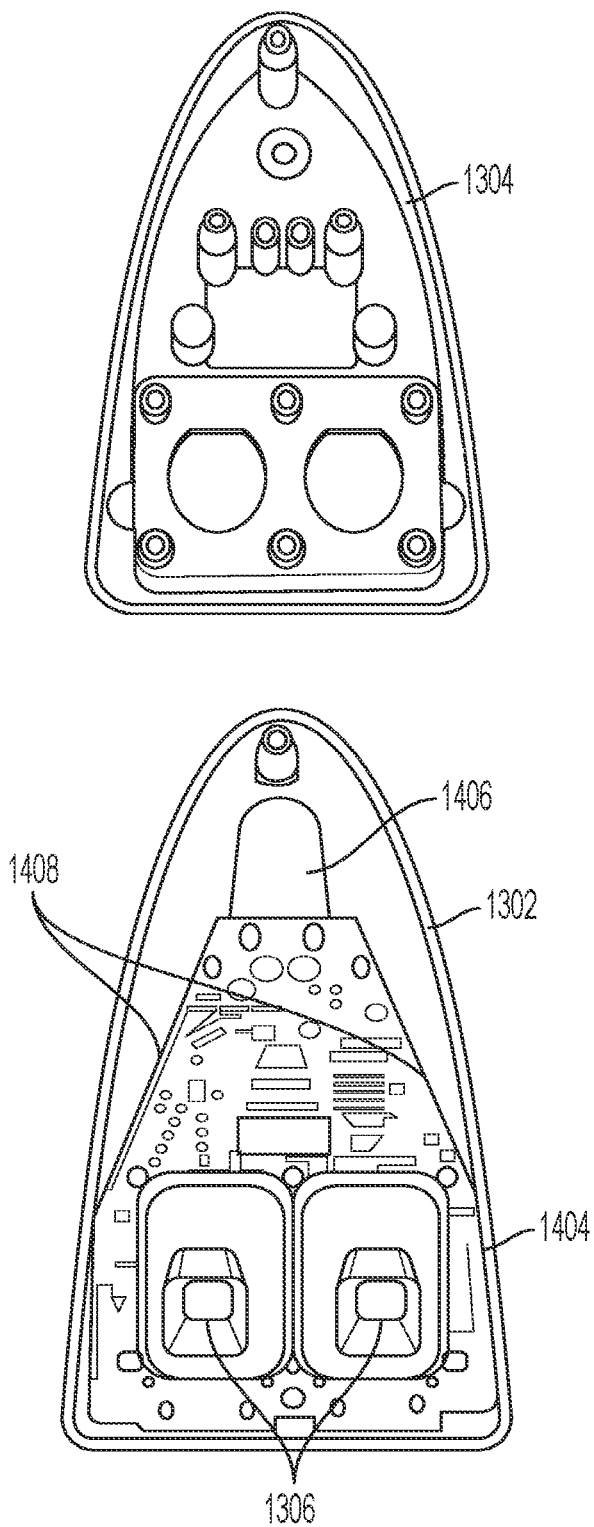
FIG. 13 depicts a UWB antenna disposed in a second enclosure.

In FIG. 13, a second type of UWB antenna disposed in a second type of enclosure 1102 is shown along with an interior of the enclosure 1102 of FIG. 11. The enclosure 1102 in FIG. 13 includes a front cover 1302, a back cover 1304, the PCB 1404, the antenna feature 1406, and connector port housings 1306. The back cover 1304 is configured to attach to the front cover 1302. In FIG. 13, the back cover 1304 includes a pair of apertures sized and shaped to receive the connector port housings 1306. The connector port housings 1306 are shown to attach directly to the PCB 1404, which includes tapered portions 1408 on upper side walls. Similar to FIG. 12, the antenna feature 1406 is shown to be positioned at an apex above the tapered portions 1408 along a PCB longitudinal axis.

Figure 14B:
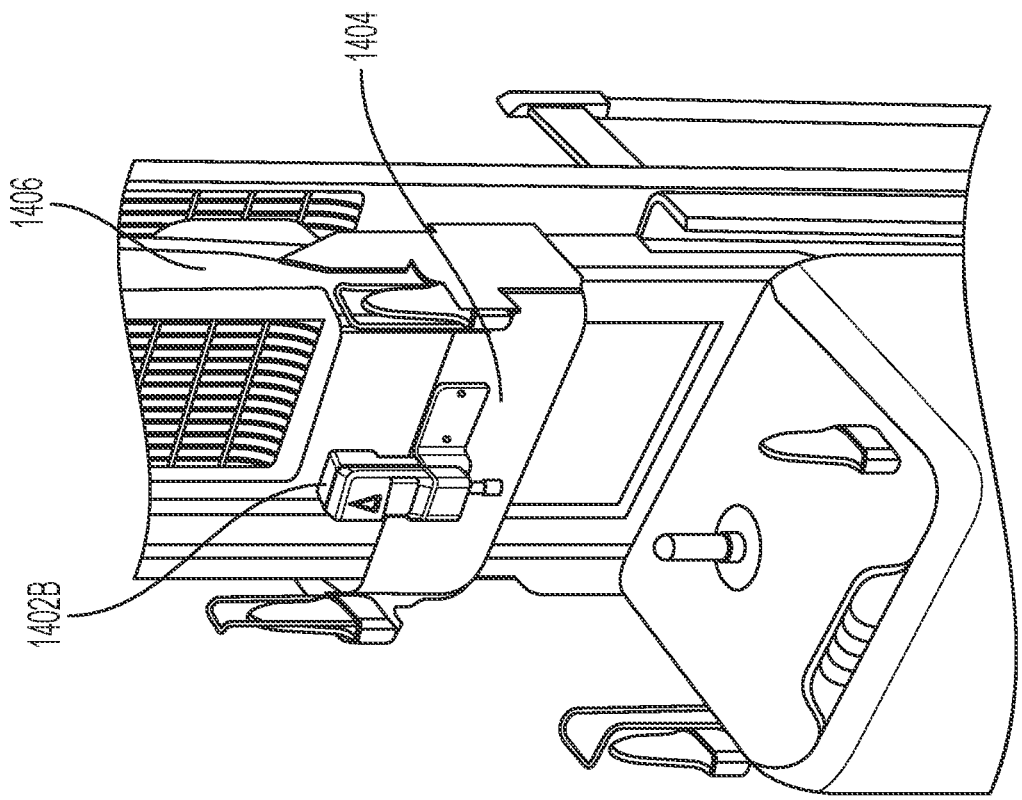
FIG. 14B depicts a second set of lighting component modules mounted to a materials handling vehicle.
Figure 14A:
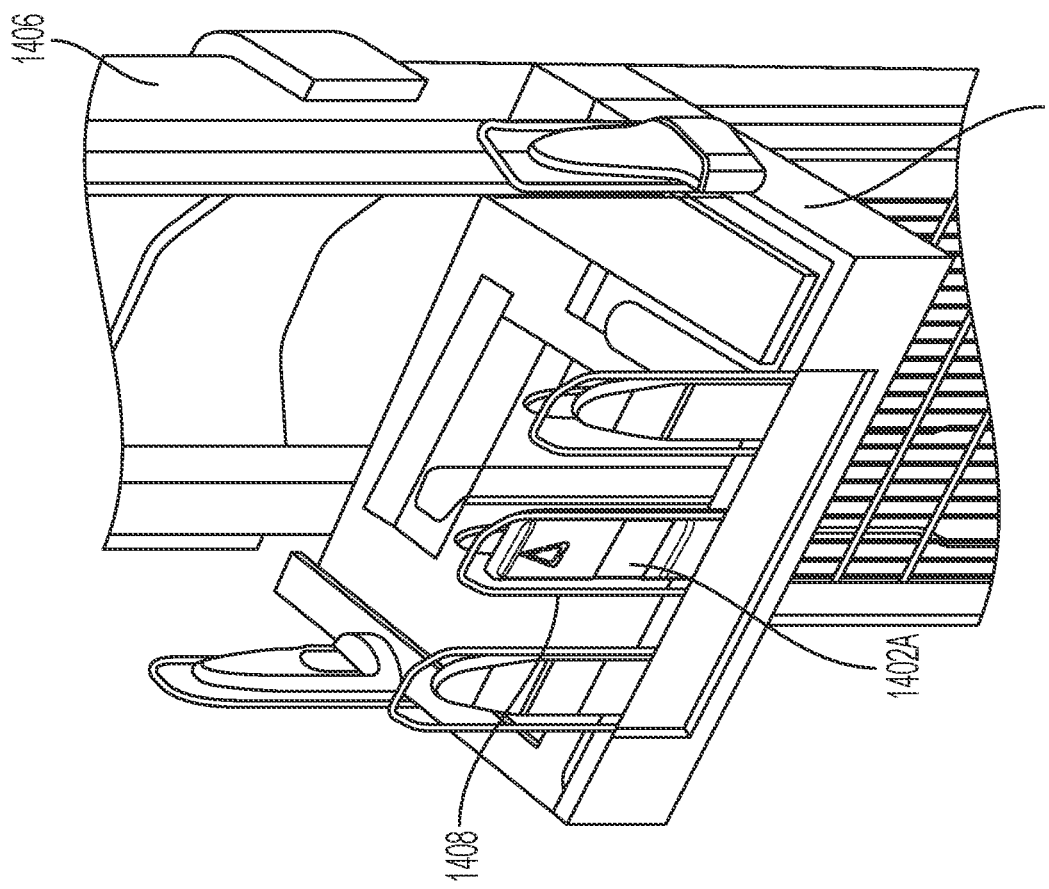
FIG. 14A depicts a first set of lighting component modules mounted to a materials handling vehicle.
Figure 15A:
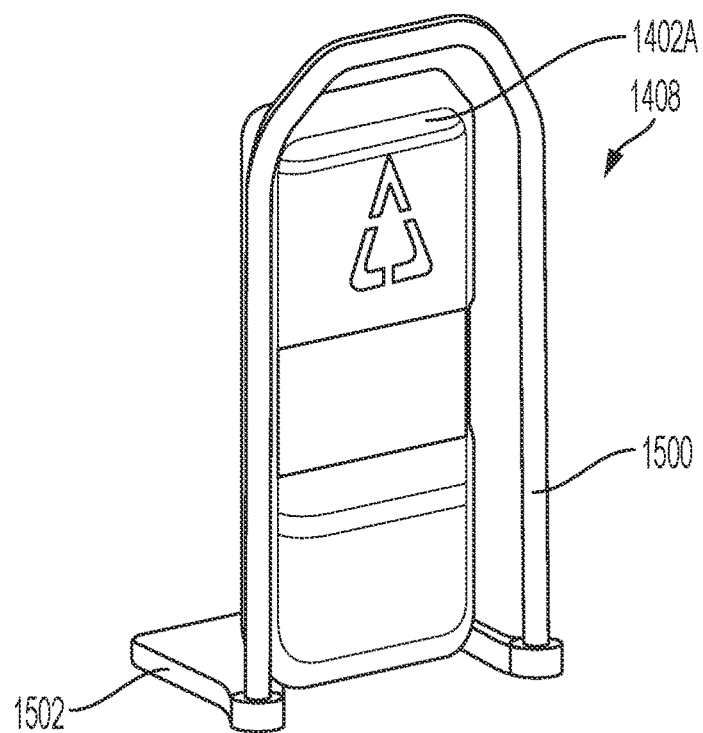
FIG. 15A depicts a first lighting component module to mount to a materials handling vehicle.
Figure 15B:
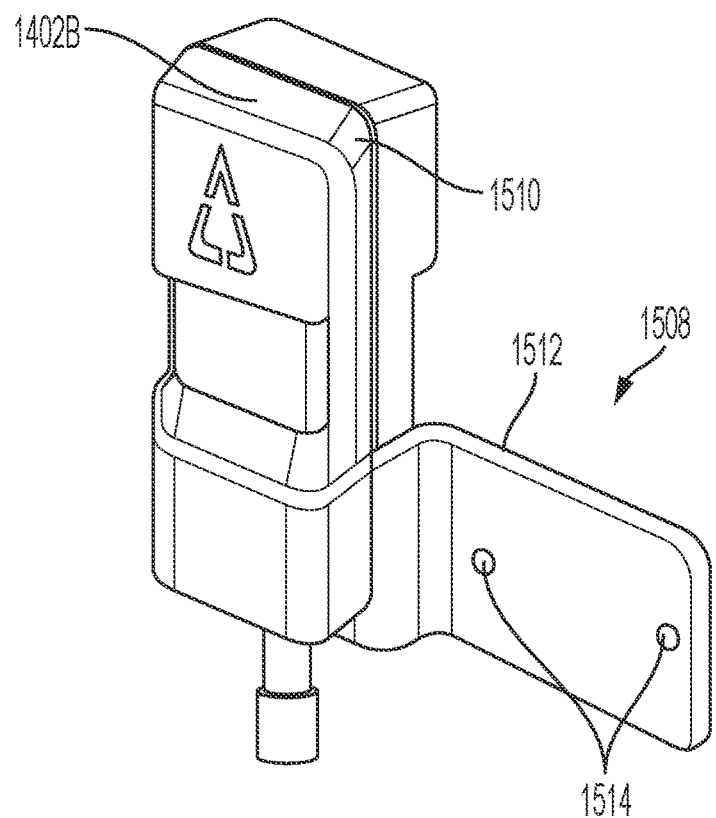
FIG. 15B depicts a second lighting component module to mount to a materials handling vehicle.

Referring to FIG. 14A, a first set of lighting component modules mounted to a materials handling vehicle 100 is shown. In FIG. 15A, a first lighting component module 1402A to mount to a materials handling vehicle 100, such as represented in FIG. 14A, is shown. Referring to FIG. 14B depicts a second set of lighting component modules mounted to a materials handling vehicle 100 is shown. In FIG. 15B, a second lighting component module 1402B to mount to a materials handling vehicle 100, such as represented in FIG. 14B, is shown.

Each lighting component module 1402A, 1402B may be configured to mount to the vehicle body of the materials handling vehicle 100. Each lighting component module 1402A, 1402B may include a plurality of symbols including at least a first symbol with a first color representative of vehicle operation without error, a second symbol with a second color representative of a cautionary vehicle warning operation, and a third symbol with a third color representative of a negative vehicle warning operation. In an embodiment, the first color is green, the second color is yellow, and the third color is red. The lighting component module 1402A, 1402B may be configured to generate an associated alert based on whether the first symbol, second symbol, or third symbol is lit. The first symbol may be configured to be lit in green as the first color and may be a proceed line portion (shown as the bottom symbol in FIGS. 15A-15B though able to be any of the top, middle, or bottom positions). The second symbol may be configured to be lit in yellow (or amber) and may include a caution triangular portion (shown as the top symbol in FIGS. 15A-15B though able to be any of the top, middle, or bottom positions). The third symbol may be configured to be lit in red and may include a block warning portion (shown as the middle symbol in FIGS. 15A-15B though able to be any of the top, middle, or bottom positions).

Referring to FIGS. 14A and 15A, the light component module 1402A may be attached to an overhead guard mounting component 1408, which may be utilized to mount or attach the light component module 1402A to an overhead guard 1400 extending from frame 1406 or to another portion of the materials handling vehicle 100. The overhead guard mounting component 1408 may include a curved part 1500 (FIG. 15A) that may be made of metal and is attached to a plate 1502 that may be metal such that the plate 1502 is positioned along a plane perpendicular to a plane intersecting the curved part 1500. A bottom portion of the plate 1502 may be configured to be adhered or attached directly onto various portions of the materials handling vehicle 100.

Referring to FIGS. 14B and 15B, the light component module 1402B may be attached to an overhead guard mounting component 1508, which may be utilized to mount or attach the light component module 1402B to another portion of the materials handling vehicle 100 such as a mast crossbrace 1404. The overhead guard mounting component 1508 may include a portion 1510 (FIG. 15B) that may be made of metal and that may be attached to the light component module 1402B and a side plate 1512 that extends in a lateral direction from the portion 1510 and includes multiple apertures 1514. The side plate 1512 may be configured to be fastened to a portion of the materials handling vehicle 100 through one or more fasteners, such as fasteners received through the apertures 1514 to fasten the side plate 1512 to the portion of the materials handling vehicle 100.

The systems described herein may support vehicle to vehicle ranging applications in addition to vehicle to anchor ranging applications between a vehicle 100 and landmarks such as discrete beacons mounted to facility infrastructure. The systems described herein may further provide vehicle zone-based control based on a vehicle localization based on a constellation map of beacons mounted to facility infrastructure to determine vehicle control in one or more zones Z (FIG. 1). The zones Z may be configured as local where the respective beacons' relative position or pose is sensed as described herein. Using data passed between the devices during the localization operations, a defining of a zone Z and location offset from the respective beacon may be communicated independent of any computation of the vehicle location relative to the warehouse. The systems described herein may also support vehicle to pedestrian ranging applications between a vehicle 100 and discrete UWB tags inserted and powered within pedestrian personal protective equipment, wearable items, or reflective vest.

The systems described herein may enable the vehicle systems to identify certain hazardous situations involving vehicle to vehicle interactions and command preventative actions accordingly, such as either slowing or stopping vehicle velocity. The systems accurately and dynamically utilize field shapes with respect to the materials handling vehicles 100 to reduce a false triggering rate of other UWB systems not dependent on relative pose and to protect against situations including virtual field overlaps that are undetectable by laser systems alone.

For the purposes of describing and defining the present invention, it is noted that reference herein to a variable being a "function" of or "based on" a parameter or another variable is not intended to denote that the variable is exclusively a function of or "based on" the listed parameter or variable. Rather, reference herein to a variable that is a "function" of or "based on" a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A relative pose determination system comprising a first materials handling vehicle, and a second materials handling vehicle, each materials handling vehicle comprising a vehicle body and a vehicle position processor, wherein:
   the first and second materials handling vehicles are configured to navigate a vehicle transit surface in a warehouse environment;
   the first materials handling vehicle comprises a first ultra-wideband (UWB) antenna array mounted to the vehicle body;
   the second materials handling vehicle comprises a second UWB antenna array mounted to the vehicle body; and
   each vehicle position processor is configured to:
      transmit a first UWB signal from the first UWB antenna array of the first materials handling vehicle to the second UWB antenna array of the second materials handling vehicle;
      receive the transmitted first UWB signal at the second UWB antenna array of the second materials handling vehicle;
      determine a second materials handling vehicle set of information based on the received first UWB signal, the second materials handling vehicle set of information comprising a first angle of arrival ($\theta_1$) and first associated timing information based on the first UWB signal received at the second UWB antenna array,
      determine a first distance ($d_1$) between the first materials handling vehicle and the second materials handling vehicle based on the transmitted first UWB signal;
      transmit a second UWB signal comprising the first angle of arrival ($\theta_1$), the first associated timing information, and the determined first distance ($d_1$) from the second UWB antenna array of the second materials handling vehicle to the first UWB antenna array of the first materials handling vehicle;
      determine a first materials handling vehicle set of information based on the transmitted second UWB signal, the first materials handling vehicle set of information comprising a second angle of arrival ($\theta_2$) and second associated timing information received at the first UWB antenna array;
      determine a second distance ($d_2$) between the first materials handling vehicle and the second materials handling vehicle based on the transmitted second UWB signal;
      transmit a third UWB signal comprising the second angle of arrival ($\theta_2$), the second associated timing information, and the second distance ($d_2$) from the first UWB antenna array of the first materials handling vehicle to the second UWB antenna array of the second materials handling vehicle, such that the first materials handling vehicle and the second materials handling vehicle receive mutual angle of arrival and distance information measured from the other vehicle;
      determine a relative pose of each of the first and second materials handling vehicles with respect to each other based on the mutually received angle of arrival and distance information from the second UWB signal and the third UWB signal; and
      operate at least one of the first and second materials handling vehicles based on the determined relative pose.

2. The relative pose determination system of claim 1, wherein the determined first distance ($d_1$) is based on the associated timing information and comprises a distance between a pair of nodes of the second materials handling vehicle and the first materials handling vehicle.

3. The relative pose determination system of claim 1, wherein the determined second distance ($d_2$) is based on the associated timing information and comprises a distance between a pair of nodes of the first materials handling vehicle and the second materials handling vehicle.

4. The relative pose determination system of claim 1, each UWB antenna array further comprising four nodes on each of the second materials handling vehicle and the first materials handling vehicle.

5. The relative pose determination system of claim 4, wherein each node of the first UWB antenna array and the second UWB antenna array comprises a UWB antenna arranged and positioned in the respective UWB antenna array and mounted on the vehicle body such that a center of the respective UWB antenna array is calibrated with respect to a center of the respective materials handling vehicle on which the respective UWB antenna array is mounted and a relative offset of each UWB antenna to the center of the respective materials handling vehicle.

6. The relative pose determination system of claim 1, wherein the first and second UWB antenna arrays comprise one or more nodes, each node comprising a UWB antenna arranged and positioned in the respective UWB antenna array and mounted on the vehicle body such that a center of the respective UWB antenna array is calibrated with respect to a center of the respective materials handling vehicle on which the respective UWB antenna array is mounted.

7. The relative pose determination system of claim 6, wherein each UWB antenna comprises a printed circuit board (PCB) including a PCB longitudinal axis, an antenna feature comprising an antenna longitudinal axis aligned in parallel with or perpendicular to the PCB longitudinal axis, and an antenna enclosure shaped and sized to receive the PCB and the antenna feature.

8. The relative pose determination system of claim 7, wherein each UWB antenna comprising the antenna feature with the antenna longitudinal axis aligned in parallel with the PCB longitudinal axis comprises a teardrop shape, the teardrop shape comprising tapered in sidewalls of the PCB with the antenna feature disposed at a shortest end of the tapered sidewalls.

9. The relative pose determination system of claim 7, wherein the antenna enclosure comprises a wall defining a pair of apertures to receive mounting prongs extending from the PCB, such that when a wall longitudinal axis of wall is disposed in parallel with the PCB longitudinal axis, the mounting prongs extend perpendicular to the PCB longitudinal axis to mount to the vehicle body at a ninety-degree angle, and when the wall longitudinal axis of wall is disposed perpendicular to with the PCB longitudinal axis, the mounting prongs extend in parallel with the PCB longitudinal axis to mount to the vehicle body at a zero-degree angle.

10. The relative pose determination system of claim 1, the relative pose comprising a first vehicle pose and a second vehicle pose, the first vehicle pose comprising a pose of the first materials handling vehicle relative to the second materials handling vehicle based on at least the first materials handling vehicle set of information and relative coordinates of transmitting nodes of the each UWB antenna array of each vehicle, and the second vehicle pose comprising a pose of the second materials handling vehicle relative to the first materials handling vehicle based on at least the second materials handling vehicle set of information and the relative coordinates of transmitting nodes of the each UWB antenna array of each vehicle.

11. The relative pose determination system of claim 10, wherein the first materials handling vehicle is configured to determine the second vehicle pose comprising the pose of the second materials handling vehicle relative to the first materials handling vehicle based on the second materials handling vehicle set of information transmitted with the second UWB signal, and the second materials handling vehicle is configured to determine the first vehicle pose comprising the pose of the first materials handling vehicle relative to the second materials handling vehicle based on the first materials handling vehicle set of information transmitted with the third UWB signal.

12. The relative pose determination system of claim 10, wherein when each of the first and second materials handling vehicles are sensed to be constrained within an aisle, each vehicle position processor is configured to independently determine an angle offset from a shared parallel structure and adjust a relative angle based on the angle offset and relative pose between the vehicles to a closest angle configured to place the vehicles in parallel.

13. The relative pose determination system of claim 1, further comprising one or more lights configured to mount to the vehicle body, the one or more lights comprising a plurality of symbols, the plurality of symbols comprising at least a first symbol with a first color representative of vehicle operation without error, a second symbol with a second color representative of a cautionary vehicle warning operation, and a third symbol with a third color representative of a negative vehicle warning operation.

14. The relative pose determination system of claim 13, wherein the first color is green, the second color is yellow, and the third color is red, and wherein the one or more lights are configured to generate an associated alert based on whether the first symbol, second symbol, or third symbol is lit.

15. A relative pose determination system comprising a vehicle position processor, a first materials handling vehicle, and a second materials handling vehicle, each materials handling vehicle comprising a vehicle body, wherein:
the first and second materials handling vehicles are configured to navigate a vehicle transit surface in a warehouse environment;
the first materials handling vehicle comprises a first ultra-wideband (UWB) antenna array mounted to the vehicle body;
the second materials handling vehicle comprises a second UWB antenna array mounted to the vehicle body; and
the vehicle position processor is configured to:
transmit a first UWB signal from the first UWB antenna array of the first materials handling vehicle to the second UWB antenna array of the second materials handling vehicle;
receive the transmitted first UWB signal at the second UWB antenna array of the second materials handling vehicle;
determine a second materials handling vehicle set of information based on the received first UWB signal, the second materials handling vehicle set of information comprising a first angle of arrival ($\theta_1$) and first associated timing information based on the first UWB signal received at the second UWB antenna array;
determine a first distance ($d_1$) between the first materials handling vehicle and the second materials handling vehicle based on the transmitted first UWB signal;
transmit a second UWB signal comprising the first angle of arrival ($\theta_1$), the first associated timing information, and the determined first distance ($d_1$) from the second UWB antenna array of the second materials handling vehicle to the first UWB antenna array of the first materials handling vehicle;
determine a first materials handling vehicle set of information based on the transmitted second UWB signal, the first materials handling vehicle set of information comprising a second angle of arrival ($\theta_2$) and second associated timing information received at the first UWB antenna array;
transmit a third UWB signal comprising the second angle of arrival ($\theta_2$), the second associated timing information, and the second distance ($d_2$) from the first UWB antenna array of the first materials handling vehicle to the second UWB antenna array of the second materials handling vehicle, such that the first materials handling vehicle and the second materials handling vehicle receive mutual angle of arrival and distance information measured from the other vehicle;
determine a relative pose of each of the first and second materials handling vehicles with respect to each other based on the mutually received angle of arrive and distance information from the second UWB signal and the third UWB signal; and
operate at least one of the first and second materials handling vehicles based on the determined relative pose.

16. A method for relative pose determination between a first materials handling vehicle and a second materials handling vehicle, each materials handling vehicle comprising a vehicle body, the first materials handling vehicle comprising a first ultra-wideband (UWB) antenna array mounted to the vehicle body, and the second materials handling vehicle comprising a second UWB antenna array mounted to the vehicle body, the method comprising:

- transmitting a first UWB signal from the first UWB antenna array of the first materials handling vehicle to the second UWB antenna array of the second materials handling vehicle;
- receiving the transmitted first UWB signal at the second UWB antenna array of the second materials handling vehicle;
- determining a second materials handling vehicle set of information based on the received first UWB signal, the second materials handling vehicle set of information comprising a first angle of arrival ($\theta_1$) and first associated timing information based on the first UWB signal received at the second UWB antenna array;
- determining a first distance ($d_1$) between the first materials handling vehicle and the second materials handling vehicle based on the transmitted first UWB signal;
- transmitting a second UWB signal comprising the first angle of arrival ($\theta_1$), the first associated timing information, and the determined first distance ($d_1$) from the second UWB antenna array of the second materials handling vehicle to the first UWB antenna array of the first materials handling vehicle;
- determining a first materials handling vehicle set of information based on the transmitted second UWB signal, the first materials handling vehicle set of information comprising a second angle of arrival ($\theta_2$) and second associated timing information received at the first UWB antenna array;
- determining a second distance ($d_2$) between the first materials handling vehicle and the second materials handling vehicle based on the transmitted second UWB signal;
- transmitting a third UWB signal comprising second angle of arrival ($\theta_2$), the second associated timing information, and the second distance ($d_2$) from the first UWB antenna array of the first materials handling vehicle to the second UWB antenna array of the second materials handling vehicle, such that the first materials handling vehicle and the second materials handling vehicle receive mutual angle of arrival and distance information measured from the other vehicle;
- determining a relative pose of each of the first and second materials handling vehicles with respect to each other based on the mutually received angle of arrival and distance information from the second UWB signal and the third UWB signal; and
- operating at least one of the first and second materials handling vehicles based on the determined relative pose.

* * * * *